United States Patent [19]
Yamasaki et al.

[11] Patent Number: 6,101,007
[45] Date of Patent: Aug. 8, 2000

[54] ONE-VISUAL-POINT IMAGE DISPLAY APPARATUS AND MULTI-VISUAL-POINTS IMAGE DISPLAY APPARATUS

[75] Inventors: Koji Yamasaki, Hannan; Eiji Shimizu, Takatsuki, both of Japan

[73] Assignee: Noritsu Koki Co., Ltd., Wakayama-ken, Japan

[21] Appl. No.: 09/219,867

[22] Filed: Dec. 24, 1998

[30] Foreign Application Priority Data

Dec. 26, 1997 [JP] Japan .................................. 9-359443

[51] Int. Cl.[7] .................................. G03H 1/00; G02B 5/32
[52] U.S. Cl. .................................. 359/15; 359/13; 359/12; 359/32
[58] Field of Search .................................. 359/13, 15, 25, 359/26, 32, 33, 12, 630

[56] References Cited

U.S. PATENT DOCUMENTS

| 5,751,259 | 5/1998 | Iwamoto .................................. 359/13 |
| 5,790,284 | 8/1998 | Taniguchi et al. . |
| 5,913,591 | 6/1999 | Melville .................................. 359/630 |

FOREIGN PATENT DOCUMENTS

| 0348137A2 | 12/1989 | European Pat. Off. . |
| 0389123A2 | 9/1990 | European Pat. Off. . |
| 0463888A2 | 1/1992 | European Pat. Off. . |
| 4-355747 | 12/1992 | Japan . |
| 8204327 A1 | 12/1982 | WIPO . |
| 9504303 A1 | 2/1995 | WIPO . |
| 9607953 | 3/1996 | WIPO . |

*Primary Examiner*—Cassandra Spyrou
*Assistant Examiner*—Fayez Assaf

[57] ABSTRACT

A screen hologram image is reproduced on or near a plane of a hologram plate. A dynamic image is displayed at a position crossing an optical path of light beam for illumination to view a dynamic image on the screen hologram image. By using a plurality of apparatuses having the above-mentioned structure, planes of hologram plates are put without overlapping or with partial or overall lapping so that planes of master hologram images are arranged at different or the same positions in space. Thus, a dynamic image is displayed for right and left eyes for stereovision. Color display is possible. Further, an image is displayed in correspondence to a change in visual point in vertical direction or in depth direction. Thus, in an image display apparatus, a dynamic image is viewed for each of the eyes by using a hologram.

26 Claims, 13 Drawing Sheets

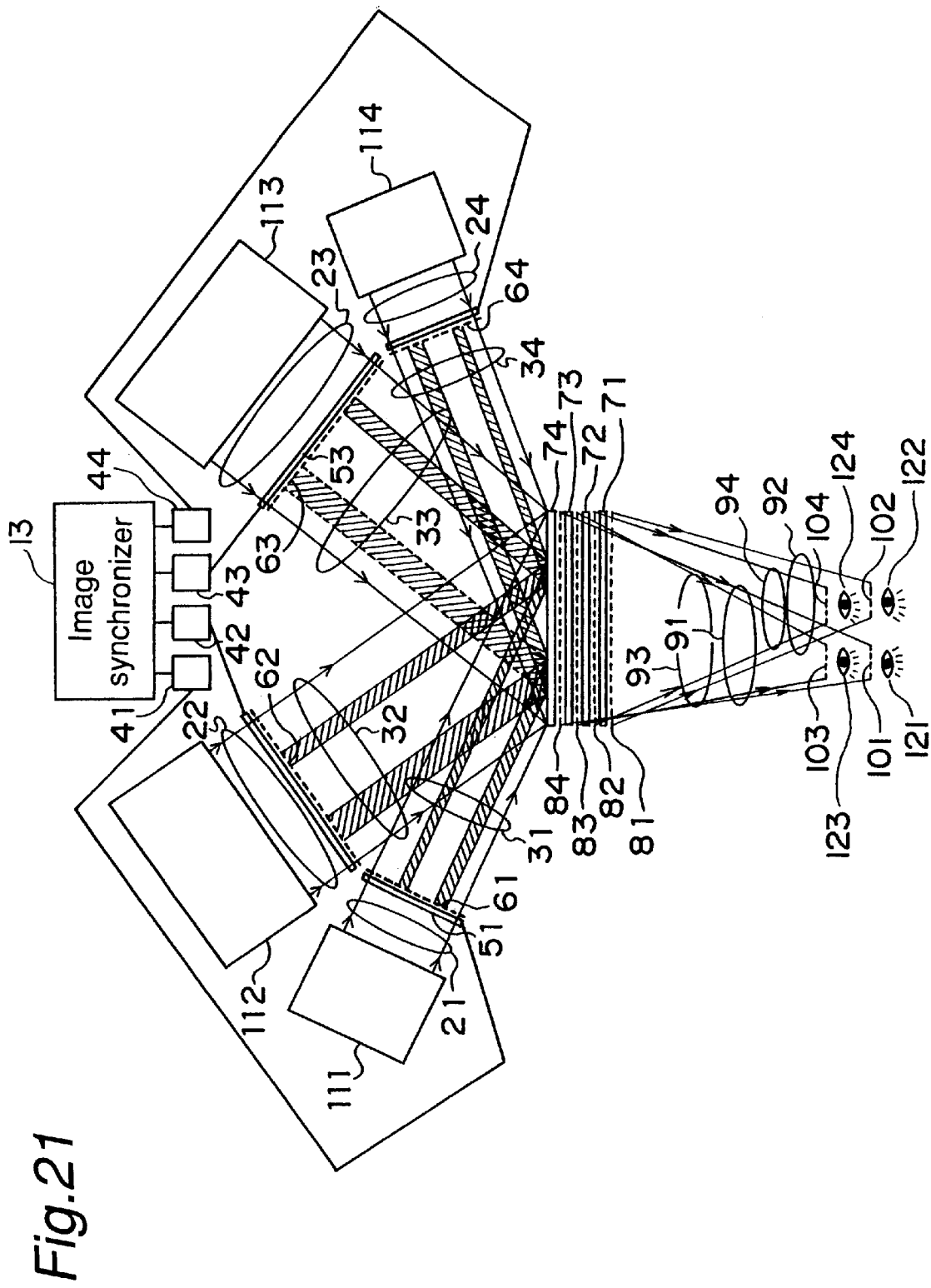

ONE-VISUAL-POINT IMAGE DISPLAY APPARATUS AND MULTI-VISUAL-POINTS IMAGE DISPLAY APPARATUS

BACKGROUND OF THE INVENTION

1. Field of the Invention

The present invention relates to an image display apparatus which realizes stereovision.

2. Description of Prior Art

In a prior art three-dimensional image display apparatus, a display screen is divided into small sections, and each section is set for right or left eye according to predetermined rules. An image for right eye is displayed for the sections for right eye, and by using a slit-like light-shielding plate, a renticular lens or the like, the image comes only along the direction to right eye. Similarly to right eye, an image for left eye is displayed for the sections for left eye, and the image comes only along the direction to left eye. Stereovision is realized by viewing these images with the two eyes at the same time.

In this approach, the image viewed by the two eyes become a rough image through a lattice-like filter, and the image is liable to be lambent for the eyes. Further, because images for right eye and for left eye are displayed at the same time for each section in the display screen, it is necessary to mix the images into one image. The apparatus is operated as follows: The image for right eye is displayed for a predetermined time, and that for left eye is displayed for the same time thereafter, the image for right eye is displayed again, and so on. The operation for changing the image is repeated briefly to display images for right eye and for left eye intermittently. Then, the image viewed by the eyes becomes intermittent, and this enhances the lambency for the eyes.

Other approaches explained below are also proposed. For example, by putting on eyeglasses having polarizing filters, color filters or the like, a screen is observed, and different images are provided for the right and left eyes. By putting on a head-mount display, different screens are observed by right and left eyes. However, these need a special tool to be put on the eyes. Then, when it is used for a long time, the viewer's body is affected largely. For example, the viewer is tired. In the approaches using the eyeglasses, the images for the right and left eyes are projected on a screen at the same time, and it is necessary to mix the two images before displaying them on the screen. In the approach using the head mount display, the images of an object viewed commonly at the right and left sides are observed from different screens. Therefore, the eyes have a large burden for uniting the images. The eyes have another large burden for focus control because the distance between the eye and the screen is different largely from that between the eye and the object.

Further, an apparatus for stereovision using a hologram is proposed. In an apparatus for displaying a stereoscopic image described in Japanese Patent laid open Publication 6-342128/1994, images displayed by two image display devices are presented as a virtual image with a hologram lens. The hologram lens has two optical powers in correspondence to the right and left eyes of the viewer, and interference fringe is formed on the hologram lens in an area where the effective light beams for the right and left eyes overlap each other. In an example shown in FIG. 5 in the publication, an image display device has at least two elements for displaying an image for right eye and another image for left eye. In this approach, in the area where the effective light beams for the right and left eyes overlap each other, an image for left eye and that for right eye are provided for the left and right eyes from the same position on the hologram lens, and a three-dimensional image can be viewed in a situation similar to actual stereovision. Further, because different image display elements are provided for right eye and for left eye as the image display devices, it is not necessary to unite the two images before displaying them on the screen.

In an apparatus for stereovision described in Japanese Patent laid open Publication 4-355747/1992, a pair of cameras receive images of the same object, as shown in FIG. 1 of the publication. Then, a pair of cathode-ray tubes project the images received by the cameras, and a pair of lenses focus the projected images at a predetermined position. A hologram screen of transmission type or reflection type is provided at the focal position to diffract the pair of the images in predetermined directions and to condense the images to the positions of the two eyes. The hologram screen is used only as a grating.

In this approach, the left and right eyes can view different images with different visual points for the left and right eyes at the same time independently at the same predetermined positions on the hologram screen, and a three-dimensional stereoscopic image of an object can be viewed in a circumstance similar to natural stereovision. It is not necessary to unite the two images before displaying them on the screen similarly to the previous approach described in Japanese Patent laid open Publication 6-342128/1994, where different image display elements are provided for right eye and for left eye in the image display device.

However, the above-mentioned apparatuses for stereovision using a hologram have following problems. In the apparatus for stereovision described in Japanese Patent laid open Publication 4-355747/1992, a projected image of the display device is enlarged and focused on a hologram screen. Therefore, the focused image is distorted at the perimeter thereof if compared with the true image.

Further, in the apparatus for stereovision described in Japanese Patent laid open Publication 4-355747/1992, because the diffracted light is condensed, the positions of the eyes cannot be displaced from the positions where the light is condensed. Further, the apparatus cannot m6 be fitted for the difference in the distance between the right and left eyes of a viewer. The image display apparatus described in Japanese Patent laid open Publication 6-342128/1994 has similar problems because the diffracted light is condensed at a particular position.

Further, in the apparatus for stereovision described in Japanese Patent laid open Publication 4-355747/1992, and in the image display apparatus described in Japanese Patent laid open Publication 6-342128/1994, an imaginary image of the condensing point is reproduced at a point symmetrical to the condensing point relative to the plans of the hologram screen or the hologram lens, for a hologram where the diffracted light is condensed. Then, the light is adazzle there and the image is hard to be viewed.

Further, in the image display apparatus described in Japanese Patent laid open Publication 6-342128/1994, an image of the image display element for providing different images for right and left eyes is enlarged by the hologram lens as an imaginary image for the viewer's eyes located near the hologram lens. Therefore, for a large-scale image display apparatus, an entire stereoscopic image cannot be viewed by the eyes of a viewer distant from the hologram lens.

Further, in the apparatus for stereovision described in Japanese Patent laid open Publication 4-355747/1992, and in the image display apparatus described in Japanese Patent laid open Publication 6-342128/1994, a plurality of viewer cannot observe the same stereoscopic image. Further, a viewer cannot observe a three-dimensional image in a wide field of view. Further, a three-dimensional image of color display cannot be observed. Further, a three-dimensional image having a difference in visual points in the vertical direction cannot be observed. Further, when a viewer moves the positions of the eyes back and forth in the depth direction, a three-dimensional image having correct visual points cannot be observed.

SUMMARY OF THE INVENTION

A first object of the invention is to provide an image display apparatus which can display a true one-visual-point image in a wide range including a peripheral part of the image.

A second object of the invention is to provide an image display apparatus which displays a one-visual-point image having uniform brightness in the entire image.

A third object of the invention is to provide an image display apparatus which displays images at true multi-visual-points in a wide range including a peripheral part thereof.

A fourth object of the invention is to provide an image display apparatus which makes it possible for a viewer to move the positions of the eyes or to fit a difference in the distance between right and left eyes for different viewers so that a viewer can see an image in an easy posture.

A fifth object of the invention is to-provide an image display apparatus which can display images from multi-visual-points similar to natural stereovision in a wide visual range.

A sixth object of the invention is to provide an image display apparatus which makes it possible to view the same stereoscopic image by a plurality of viewers at the same time.

A seventh object of the invention is to provide an image display apparatus which can display a color three-dimensional stereoscopic image.

An eighth object of the invention is to provide an image display apparatus which makes it possible to view a three-dimensional image even when a viewer moves right and left eyes in vertical direction or in depth direction.

A ninth object of the invention is to provide a method for manufacturing a hologram plate used for the above-mentioned image display apparatuses.

A one-visual-point image display apparatus according to the invention comprises:

a light beam generator which generates a directional light beam for illumination;

a hologram plate of transmission type or reflection type which diffracts the light beam generated by the light beam generator to generate a directional diffracted light beam, the hologram plate reproducing a screen as a hologram image on or near a plane of the hologram plate by illumination of the light beam, a beam of diffracted light which outgoes from the hologram plate forming a focal plane of a master hologram plate at a position of an image of the master hologram plate which have been used in fabrication of the hologram plate in two-step photography, whereby a hologram image of the screen is observed only when the hologram plate is viewed with eyes located within a range of the focal plane;

a mask image display device which is set at a position crossing an optical path of the light beam generated by the light beam generator and displays a two-dimensional mask image pattern which masks the light beam for illumination, the light beam for illumination which transmits the mask image display device being converted to a post-mask light beam which projects the mask image pattern, wherein the post-mask light beam illuminates the hologram plate instead of the light beam for illumination to project the mask image pattern on the reproduced hologram image of the screen, whereby the hologram image of the screen affected by the mask image pattern is viewed with eyes located within the range of the focal plane; and a mask image information generator which transmits mask image information to the mask image display device to make the mask image display device display the mask image pattern on a display screen of the mask image display device.

In the one-visual-point image display apparatus, the light beam for illumination outgoing from the light beam generator is diffracted by the hologram plate, and the screen hologram image is reproduced on or near the plane of the hologram plate. The mask image information transmits the image information (for example, monochromatic gradation mask image information) to the mask image display device, to make it display the mask image pattern on a display screen thereof, and the light beam for illumination is converted to post-mask light beam. Thus, the screen hologram image affected by the mask image pattern of post-mask light beam is formed on or near the plane of the hologram plate. The diffracted light beam outgoing from the hologram plate forms a focal plane at the position of the master hologram plate image. Thus, the reproduced screen hologram image (the image on the screen) can be viewed vividly only by eyes put in the focal plane.

In the one-visual-point image display apparatus, preferably, the light beam for illumination is propagated in a direction in parallel to one of a side of the hologram plate, and the mask image display device is put perpendicular to the light beam, or it is put in parallel to the hologram plate, or it is arranged so that a side thereof is in parallel to a side of the hologram plate to which the light beam is incident in parallel. Further, the mask image display device has at least one length of a side of the mask image pattern displayed by the mask image display device to coincide with that of a counterpart side of the hologram plate, and lengths of the other sides thereof are enlarged or reduced with a ratio of lengths of counterpart sides of the mask image display device and the hologram plate. Thus, distortion correction in the vertical and horizontal directions of the mask image formed by the mask image information generator becomes easy, and a correct image from a visual point can be projected without distortion in a wide range on the entire screen hologram image including the perimeter thereof.

In the one-visual-point image display apparatus, because the diffracted light beam outgoing from the hologram plate has a focal plane at the position of the master hologram plate image, the diffracted light beam is not condensed at a particular point, and it extends in a plane over a certain acceptable range in space. Therefore, a viewer can move the eye put in the focal plane within the plane.

Further, in the one-visual-point image display apparatus, because the diffracted light beam outgoing from the hologram plate has a focal plane at the position of the master hologram plate image, the diffracted light beam is not condensed at a particular point, and it extends in a plane over a certain acceptable range in space. Therefore, the unnecessary imaginary image of the master hologram plate image is weakened and becomes invisible.

Further, in the one-visual-point image display apparatus, because the screen hologram image is reproduced on or near the plane of the hologram plate, the imaginary image of the screen hologram image overlaps with the real image thereof and becomes hard to be recognized. Thus, an image from a visual point can be displayed with uniform brightness over the entire screen.

Preferably, in the one-visual-point image display apparatus, the light beam for illumination generated by the light beam generator is a collimated beam. By using the collimated light beam, the correspondence becomes easy between the mask image pattern displayed by the mask image display device and the screen hologram image reproduced on the hologram plate.

Preferably, in the one-visual-point image display apparatus, the light beam for illumination generated by the light beam generator is a diverging beam. By using the diverging light beam, the mask image pattern displayed in the mask image display device can be expanded for display on the screen hologram image reproduced on the hologram plate.

Preferably, in the one-visual-point image display apparatus, the light beam for illumination generated by the light beam generator is a converging beam. By using the converging light beam, the mask image pattern displayed in the mask image display device can be reduced for display on the screen hologram image reproduced on the hologram plate.

Preferably, the hologram plate in the one-visual-point image display apparatus transmits light in an external field of view in front of the hologram plate.

Preferably, the hologram plate in the one-visual-point image display apparatus is of reflection type, and a light-shielding plate is provided between the hologram plate and the external field of view in front of the hologram plate.

Preferably, the hologram plate provided in the one-visual-point image display apparatus generates a plurality of focal planes at different positions. Thus, the hologram image of the same screen is viewed at the different positions.

A multi-visual-points image display apparatus according to the invention comprises a plurality of the above-mentioned one-visual-point image display apparatuses. The plurality of one-visual-point image display apparatuses are arranged so that respective focal planes thereof are arranged at at least two different positions in space. Thus, right and left eyes of a viewer are located at the same time within the focal planes at the different positions and view the screen hologram images independently of each other in correspondence to the focal planes at which the eyes are located.

Because the focal planes of the one-visual-point image display apparatuses are arranged at different positions in space, when a viewer puts one eye at at least one focal plane in the focal planes selected at the same time and the other eye at at least one different focal plane, respective screen hologram images affected by different patterns are viewed by right and left eyes. Among respective dynamic images emerging on the screen hologram images of the one-visual-point image display apparatuses affected by the mask image patterns for different visual points changing in time, dynamic images from different visual points at the same time in correspondence to the positions of right and left eyes can be provided respectively for right and left eyes. Because the hologram images are planar, even if the distance between the two eyes is different among viewers, the difference in distance is fitted. Therefore, a viewer sees images from different visual points at easy posture by putting left and right eyes on the different planes of the master hologram plate images in correspondence to right and left eyes.

Further, because a viewer sees the screen hologram images projected with mask image patterns on or near the planes of the hologram plates, the entire screen hologram images are viewed both from right eye and from left eye even when the positions of the two eyes of a viewer is far from or near the hologram image plate. Thus, images from different visual points similar to natural stereovision in a wide range can be displayed both by a large image display apparatus and by a compact image display apparatus.

Preferably, the multi-visual-points image display apparatus comprises at least two sets of the plurality of the one-visual-point image display apparatuses. One of the at least two sets has at least two focal planes overlapping at the same positions in space in the focal planes of the one-visual-point image display apparatuses in the one of the at least two sets. Hologram images of all the screens in correspondence to the overlapped focal planes are viewed continuously in space when eyes are put in a range of the overlapped focal planes (hereinafter referred to as focal plane group). The focal plane groups of the at least two sets are arranges at at least two different positions in space such that right and left eyes of a viewer can be put within the focal plane groups at different positions at the same time, whereby a group of hologram images of screens continuous in space in correspondence to the focal plane groups in the sets wherein the eyes are put are viewed continuously independently of each other. Then, a viewer sees stereovision in a wide field of view.

Preferably, in the multi-visual-points image display apparatus, all or a part of hologram images of each screen of the plurality of one-visual-point image display apparatuses are overlapped at the same position in space, and all the focal planes in correspondence to the overlapped hologram images of screens are arranged at different positions in space such that right and left eyes of a viewer are put within the focal planes at the different positions at the same time. Thus, the hologram images of the screens are viewed independently of each other without affected each other. Dynamic images of different parallaxes are provided for right and left eyes at the same time, and a viewer sees stereovision with precise depth perception.

Preferably, in the multi-visual-points image display apparatus, all or a part of hologram images of each screen in each of at least two sets of the plurality of one-visual-point image display apparatuses are overlapped at the same position in space, and all the focal planes in correspondence to the overlapped hologram images of screens in all the sets are arranged at different positions in space such that right and left eyes of a viewer are put within the focal planes at the different positions at the same time. Thus, the hologram images of the screens are viewed independently of each other without affected each other. A viewer sees stereovision in a wide field of view with precise depth perception.

Preferably, in the multi-visual-points image display apparatus, the plurality of one-visual-point image display apparatuses are combined in at least two sets. In each set of the at least two sets, at least two screen hologram images and at least two focal planes are overlapped at the same positions in space, respectively, colors of the light beams for illumination generated by the light beam generators are different. Each of the hologram plates have been fabricated in photography by using corresponding different colors. Each of the mask image information generators transmits information on mask image pattern extracted on corresponding color in mask image information viewed in the same direction at the same time to relevant mask image display device. The plurality of one-visual-point image display apparatuses are arranged such that when eyes are put in a range of the overlapped focal planes (hereinafter referred to as focal plane group). The colors are mixed to form one color screen hologram image. The focal plane groups in each of the at least two sets are arranged at at least two different positions in space such that right and left eyes of a viewer can be put within the focal plane groups at different positions at the same time. Thus, color screen hologram images are viewed independently of each other as one color screen hologram image in correspondence to the focal plane groups wherein the eyes are put are viewed, and a viewer sees color stereovision.

Preferably, in the multi-visual-points image display apparatus, all or a part of the screen hologram images viewed as one image in each set of the at least two sets of the one-visual-points image display apparatuses are overlapped at the same position in space, and the focal plane groups of all the sets in correspondence to the overlapped screen hologram images are arranged at different positions in space. Right and left eyes of a viewer can be put within the focal plane groups at the different positions, and color screen hologram images in correspondence to the focal plane groups wherein the right and left eyes are put are viewed as one image independently by the right and left eyes. Then, a viewer sees color stereovision with precise depth perception. no Preferably, in the multi-visual-points image display apparatus, the different colors are red, green and blue. Then, a viewer sees color stereovision in a simple way.

Preferably, in the multi-visual-points image display apparatus, the light generator in the one-visual-point image display apparatus generates a light beam for illumination of polychromatic light or white light. Each of the hologram plates has been fabricated in photography with different colors, and each of the hologram plates generates the diffracted light beam of a corresponding color. Thus, the color screen hologram images can be viewed due to overlapping.

Preferably, in the multi-visual-points image display apparatus, the light generator in the one-visual-point image display apparatus generates a light beam for illumination of polychromatic light or white light. Each of the hologram plates have been fabricated as a rainbow hologram plate, and each of the hologram plates are reproduced to form the focal planes of rainbow colors by diffracted light beams and dispersed into rainbow colors. The focal planes are arranged to be displaced each other in parallel to overlap portions of different colors at the same position in space. When eyes are put in the planes of the overlapped master hologram plate images, all the screen hologram images in correspondence to the overlapped master hologram plate images can be viewed at the same time. By overlapping respective dynamic images of screen hologram images of different colors, a color screen hologram images are viewed at the same time by right and left eyes.

Preferably, the multi-visual-points image display apparatus comprises at least two sets, each set comprising the multi-visual-points image display apparatus having at least two visual points. The focal planes of the one-visual-points image display apparatuses in each set are arranged at adjacent positions to each other. The mask image information generators make the mask image display devices display the same mask image patterns in correspondence to the same ordinal number in the order of the focal planes from right side to left side in each set. Thus, a plurality of viewers see the same image from multi-visual points at the same time.

Preferably, in the multi-visual-points image display apparatus, a focal plane at the leftmost end of the one-visual-point image display apparatus in one of the sets is arranged near a focal plane at the rightmost end of the one-visual-point image display apparatus in another of the sets. Thus a plurality of viewers in a row can see the same image from multi-visual-points at the same time.

Preferably, in the multi-visual-points image display apparatus, at least two sets are provided wherein one-visual-points image display apparatuses with at least two visual points are combined as a set. The focal planes of the one-visual-points image display apparatuses in each set are arranged at adjacent positions to each other. A row of the focal planes in each set are arranged at different positions adjacent in depth direction back and forth, and the mask image information generators generate mask image informations by changing visual angle and an expansion or reduction ratio on the mask image pattern of the mask image information to be generated according to distance in depth direction. Thus, stereovision is realized consistently when positions of viewer's eyes are moved back and forth.

Preferably, in the multi-visual-points image display apparatus, at least two sets are provided wherein one-visual-points image display apparatuses with at least two visual points are combined as a set. The focal planes of the one-visual-points image display apparatuses in each set are arranged at adjacent positions to each other. A row of the focal planes in each set are arranged at different positions adjacent in the vertical direction, and the mask image information generators generate mask image informations by changing difference in visual angle on the mask image pattern of the mask image information to be generated according to difference in visual angle in the vertical direction. Thus, stereovision is realized consistently vertically and horizontally when positions of viewer's eyes are moved vertically.

Preferably, in the multi-visual-points image display apparatus, the mask image information transmitted by the mask image information generators in the one-visual-point image display apparatuses is information on monochromatic gradation mask image pattern. An image is viewed in a particular direction in a simple way, by using the gradation mask image pattern.

Preferably, the multi-visual-points image display apparatus further comprises an image synchronizer connected to the mask image information generators and supplying synchronization signals to generate mask image patterns. According to the synchronization signals, the mask image patterns in different visual directions at the same time are displayed by agreeing timings with each other automatically.

Preferably, in the multi-visual-points image display apparatus, at least two in the one-visual-point image display apparatuses have a common hologram plate as the hologram plates, and the common hologram plate records screen hologram images overlapped with each other of the at least two one-visual-point image display apparatuses on or near the hologram plate. Then, the thickness of the hologram plates in the entire apparatus is decreased.

Preferably, in the one-visual-point image display apparatus or in the multi-visual-points image display apparatus, at least one hologram plate has been fabricated to have a plurality of focal planes at different positions in space. Thus, hologram images of the same screen are viewed respectively at different positions.

Preferably, in the multi-visual-points image display apparatus, at least one hologram plate provided in the one-visual-point image display apparatus generates a plurality of focal planes at different positions. Thus, the hologram image of the same screen is viewed at the different positions.

A method according to the invention for manufacturing a hologram plate fabricates the hologram plate in the one-visual-point image display apparatus. In this method, (1) a screen is put in front of a film for master hologram, a coherent light beam from a light source is halved, the screen is illuminated with one of the halved light beams and the film for master hologram is exposed to light reflected from the screen as object light, the other of the halved light beams is collimated to expose the film directly as reference light, and interference fringe of the object light and the reference light is recorded in the film. Thus, a master hologram plate is fabricated. Next, (2) the C. fabricated master hologram plate is illuminated with an illumination light having the same quality of coherence as the reference light in a direction opposite to the reference light, wherein diffracted light beam is generated to reproduce a screen hologram image as a real image of the screen in space, a film for hologram of transmission type or reflection type is put at a position of the screen hologram image, a light beam is separated from the same light source of the illumination light to provide collimated, converging or diverging light beam as reference light, the film for hologram is exposed to the reference light at the same side as the diffracted light beam for transmission type and at the opposite side as the diffracted light beam for reflection type, interference fringe of the diffracted light beam and the reference light is recorded in the film for hologram of transmission type or reflection type. Thus, the hologram plate is fabricated by using two-step photography. The hologram plate is used as the hologram plate in the above-mentioned one-visual-point image display apparatus by providing a directional light beam for illumination to the hologram plate in a direction opposite to the reference light.

BRIEF DESCRIPTION OF THE DRAWINGS

These and other objects and features of the present invention will become clear from the following description taken in conjunction with the preferred embodiments thereof with reference to the accompanying drawings, and in which:

FIG. 21 is a diagram of a multi-visual-point image display apparatus according to an eighth embodiment of the invention using transmission type hologram images.

DETAILED DESCRIPTION OF THE PREFERRED EMBODIMENTS

Figure 1:
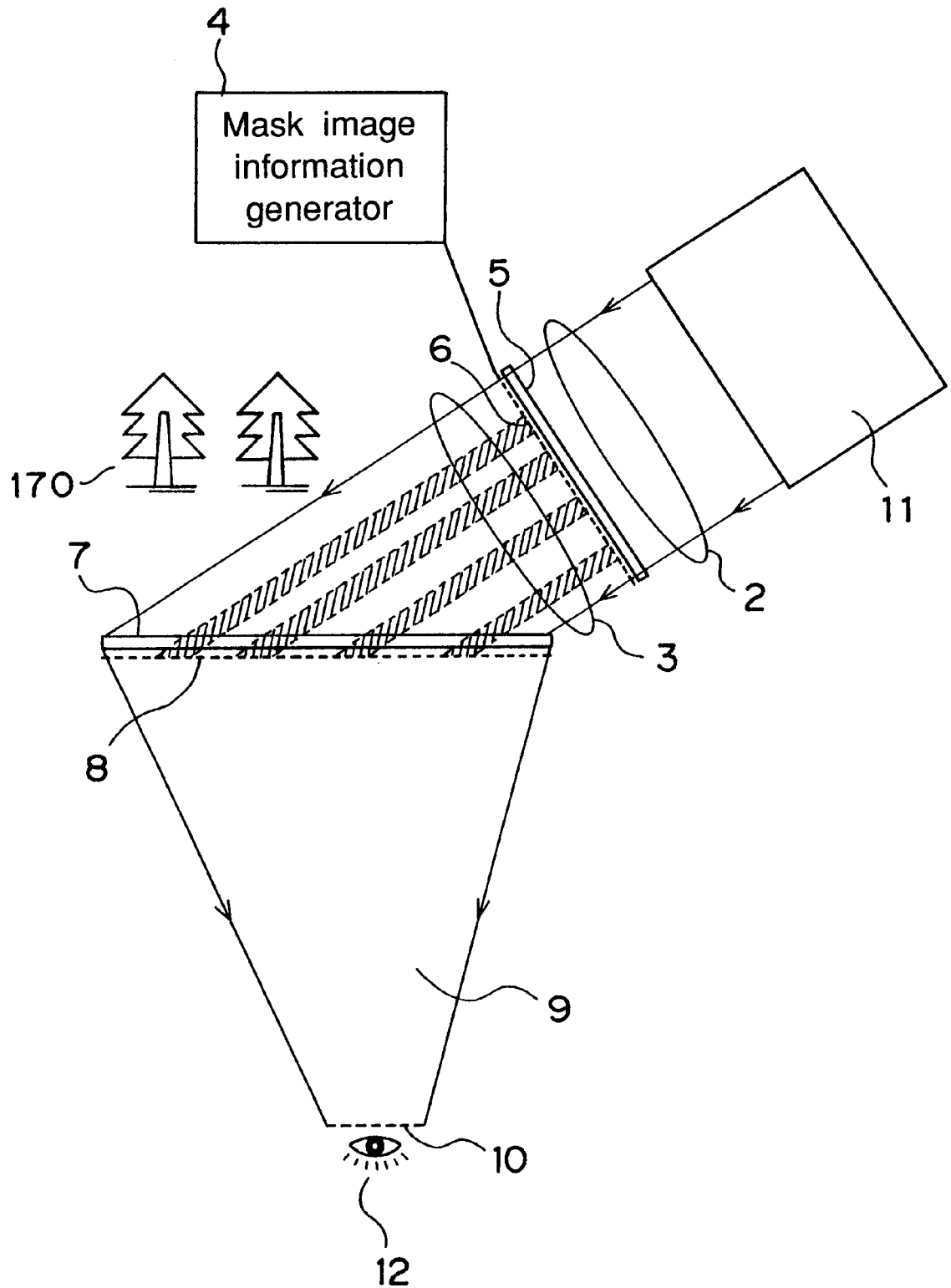
FIG. 1 is a schematic sectional view of a one-visual-point image display apparatus using a hologram plate of transmission type.

Referring now to the drawings, wherein like reference characters designate like or corresponding parts throughout the several views, FIG. 1 shows Embodiments of the present invention will be explained with reference to drawings.

First, a one-visual-point image display apparatus displaying an image at one (particular) visual point is explained. Multi-visual-points image display apparatuses which will be explained later use a plurality of the one-visual-point image display apparatuses to view a dynamic image at different visual points at the same time at different positions in space, such that stereovision from multi-visual points is possible by providing dynamic images suitable for right and left eyes selectively. Then, a viewer can view hologram images of the same screen at different positions separately. The multi-visual-points image display apparatus is created based on a new idea on multi-visual-points display that an image is displayed for stereovision on a plurality of hologram images of planar screens reproduced optically.

The one-visual-point image display apparatus displays an image from one (particular) visual point. A hologram image of screen reproduced on or near a plane of a hologram plate is masked by a mask image, and the masked hologram image of screen is viewed only from an eye put at the position of an image of master hologram plate. Thus, the mask image is shown on the hologram image of screen when viewed by the eye put on the plane of the master hologram plate. The hologram plate will be explained later.

FIG. 1 shows a one-visual-point image display apparatus using a hologram plate of transmission type. A light beam generator 11 for illumination emits a directional light beam 2 for illumination to be incident on a hologram plate 7 of transmission type. The hologram plate 7 reproduces a hologram image 8 of a planar screen on or near the plane of the hologram plate 7 by diffracting the light beam at the hologram plate 7 of transmission type. Further, the diffracted light beam 9 outgoing from the hologram plate 7 forms a planar plane as a master hologram plate image 10. By forming the planar master hologram plate image 10, the reproduced screen hologram image 8 is viewed vividly only from the eye (particular visual point) 12 put on the plane of the image 10.

Further, in order to display a dynamic image, a mask image display device 5 is put at a position crossing an optical path of the light beam 2 for illumination, and it is connected to a mask image information generator 4. The mask image display device 5 is for example a liquid crystal shutter, and the mask image information generator 4 is for example an image signal generator which generates image signals for driving the liquid crystal shutter. When image signals based on the mask image information (such as monochromatic, gradation mask dynamic image information) are received from the mask image information generator 4, the mask image display device 5 displays the mask image (mask image pattern) 6 based on the image signals on the plane of the mask image display device 5. The light beam 2 for illumination is masked by the mask image pattern 6 to be converted to a post-mask light beam 3. (In FIG. 1, ellipses represent extension of the light beam schematically.) The hatching in FIG. 1 shows schematically portions masked by the mask image pattern 6. Then, the screen hologram image 8 affected by the mask image pattern of the post-mask light beam 3 is viewed from the eye 12 on the master hologram plate image 10, and when the eye 12 views the hologram plate 7, a video image is shown on the screen. (In FIG. 1, the eye 12 is displayed at a position displaced from the plane of the master hologram plate image 10 for the ease of illustration.)

As described above, the diffracted light beam 9 outgoing from the hologram plate 7 forms a focal plane as the master hologram plate image 10. That is, the diffracted beam is not condensed at a specified point, and it extends in a plane over an acceptable range in space. Then, it is possible for a viewer to move the eye 12 in the plane of the master hologram plate image 10. Further, because the diffracted beam extends in a plane over an acceptable range in space without condensed at a specified point, the unnecessary imaginary image of the master holograph plate image 10 is weakened to become invisible or it is not adazzle. Because the screen hologram image 8 is reproduced on or near the plane of the hologram plate 7, the imaginary image of the screen hologram image 8 overlaps with the real image and becomes hard to be recognized. Thus, a one-visual-point image can be displayed with uniform brightness over the entire screen.

The mask image display device 5 is put at a position crossing the optical path of the light beam 2 for illumination slantly. The light beam 2 emitted from the light beam generator 11 is collimated and the light beam is illuminated in a direction parallel to a side of the hologram plate 7. The mask image display device 5 is put perpendicular to the light beam 2, or it is put in parallel to the hologram plate 7, or it is arranged so that a side thereof is in parallel to a side of the hologram plate 7 to which the light beam 2 is incident in parallel. Then, the length of at least one side of the mask image 6 generated by the mask image information generator 4 is adjusted to agree with that of the counterpart of the hologram plate 7, and the length of the other planes of the hologram plate 7 are expanded or reduced at a ratio of the length of the side of the mask image display device 5 to the counterpart of the hologram plate 7. Therefore, it is easy to correct distortion of the mask image 6 generated by the mask image information generator 4 in the vertical and horizontal directions, and a correct image without distortion is projected on the whole plane of the screen hologram image 8 in a wide range including the perimeter.

The hologram plate 7 may be fabricated so that a light from an external field of view in front thereof is also transmitted. Then, it is possible to display a dynamic image in a background of the external field of view. For example, in FIG. 1, the screen hologram image 8 affected by the mask image pattern is viewed on the background 170.

Figure 2:
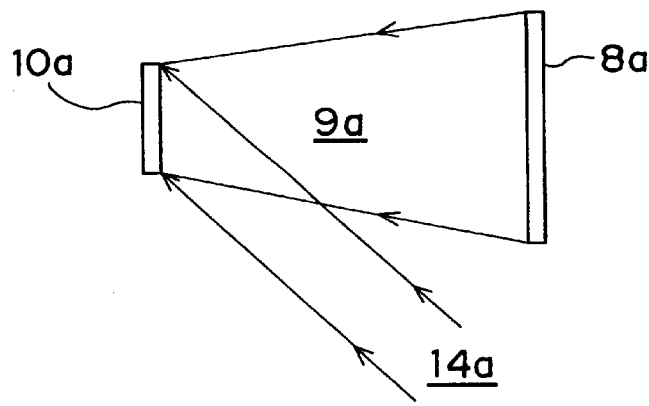
FIG. 2 is a diagram on a first step of a method of fabricating a hologram plate of transmission type in two-step photography.
Figure 3:
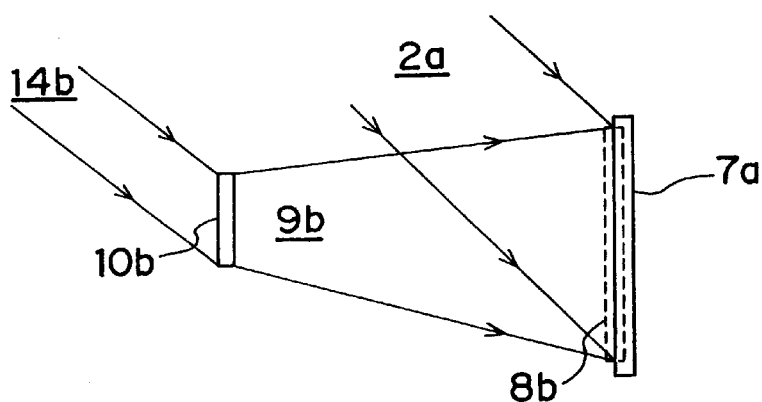
FIG. 3 is a diagram on a second step of the method of fabricating a hologram plate of transmission type in two-step photography.
Figure 4:
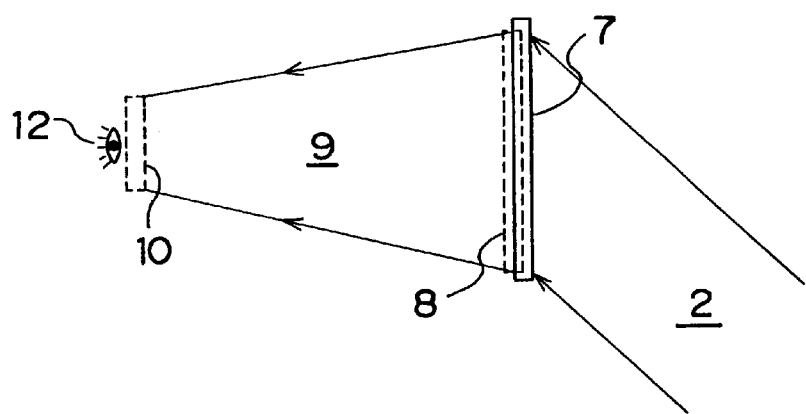
FIG. 4 is a diagram for illustrating observation of a screen hologram image with a hologram of transmission type.

FIGS. 2 to 4 show schematically a method for fabricating the hologram plate 7 of transmission type used in FIG. 1 with two-step photography. By using the two-step photography, the overlap of the real image with the imaginary one is prevented, and the unnecessary dazzle imaginary image is deleted.

In the first step in the two-step photography, as shown in FIG. 2, a white rectangular screen 8a is put before a film 10a for master hologram. Then, a coherent light beam from a light source, such as a laser beam, is halved by a half-mirror or the like. One of the light beams illuminates the screen 8a, and the light reflected thereby enters into the film 10a for master hologram as object light 9a. The other thereof enters directly into the film 10a as reference light 14a. As a result, an interference fringe of the object light 9a and the reference light 14a is recorded in the film 10a for master hologram.

In the second step in the two-step photography, as shown in FIG. 3, an illuminating light 14b having the same quality of coherency as the reference light 14a illuminates the master hologram plate 10b, in which the interference fringe formed on the film 10a is fixed at the first step, in a direction reverse to that of the reference light 14a. Then, a diffracted light beam 9b is generated to reproduce a screen hologram image 8b as the real image of the screen 8a. A film 7a for hologram of transmission type is put at the position of the screen hologram image 8b, and a reference light 2b separated from the same light source as the light beam 14b for illumination enters the film 7b at the same side as the diffracted light beam 9b. Thus, an interference fringe of the diffracted light beam 9b with the reference light 2a is recorded in the film 7a for hologram of transmission type.

As shown in FIG. 4, the screen hologram image is viewed by using the hologram plate 7 of transmission type in which the interference fringe formed on the film 7a for the hologram of transition type is fixed. An illuminating light 2 having the same quality of directivity as the reference light 2a illuminates the hologram plate 7 of transmission type in a direction reverse to that of the reference light 2a. Then, a diffracted light beam 9 is generated to reproduce a screen hologram image 8 as the real image of the screen hologram image 8b and a master hologram image 10 as the real image of the master hologram image 10b. Thus, only when the eye 12 is put in the position of the planar master hologram plate image 10, the screen hologram image 8 can be viewed clearly.

Figure 5:
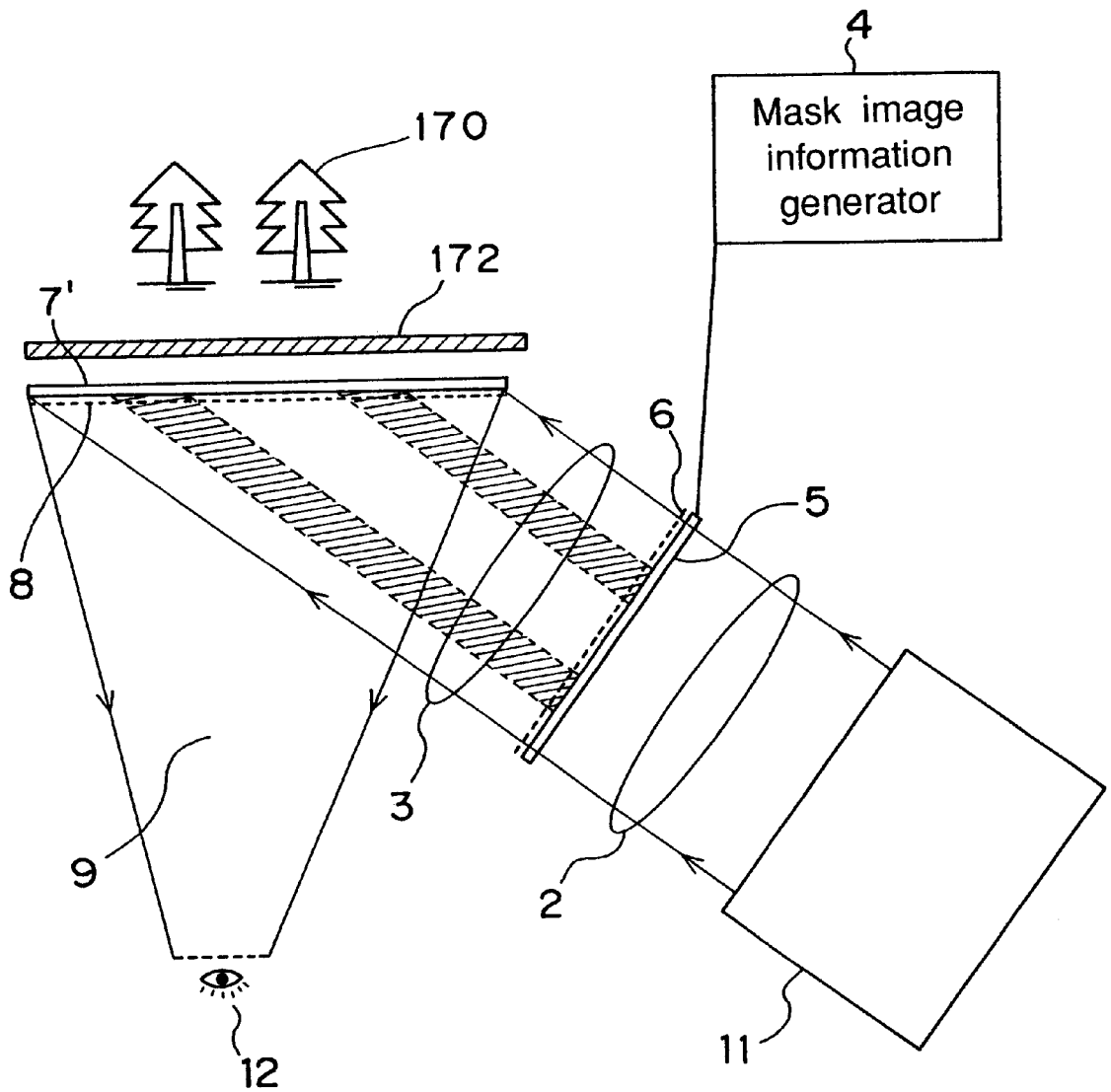
FIG. 5 is a schematic sectional view of a one-visual-point image display apparatus using a hologram plate of reflection type.

FIG. 5 shows a one-visual-point image display apparatus using a hologram plate 7' of reflection type. It is different from the apparatus shown in FIG. 1 in that the hologram plate 7' of reflection type is used instead of the hologram plate of transmission type and that the arrangement of the light beam generator 11 and the like are changed in correspondence to the adoption of the hologram plate 7'. Because the light beam is reflected by the hologram plate 7' of reflection type, the direction of the diffracted light beam 9 outgoes with respect to the hologram plate 7' from the same plane as the incident plane of the post-mask light beam 3 in FIG. 5, in contrast to the counterpart outgoing from the opposite plane to the incident plane shown in FIG. 1. Further, the direction of the mask image 6 generated by the mask image information generator 4 is bilateral between FIGS. 1 and 5. It is understood to be natural that the direction of the mask image 6 is upside down between FIGS. 1 and 5 if the incident direction of the post-mask light beam 6 is downward or upward from the hologram plate 7'. Further, a light-shielding plate 172 can be provided between the hologram plate 7' of reflection type and the background 170 at the external field of view in the front side. Then, a viewer sees only the screen hologram image 8 affected by the mask image pattern.

Figure 6:
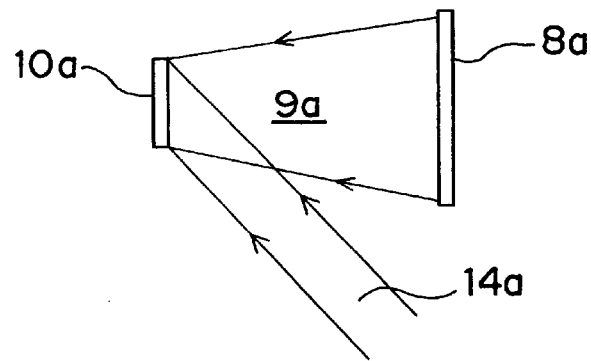
FIG. 6 is a diagram on photographing of a first step of a method of fabricating a hologram plate of reflection type in two-step photography.
Figure 7:
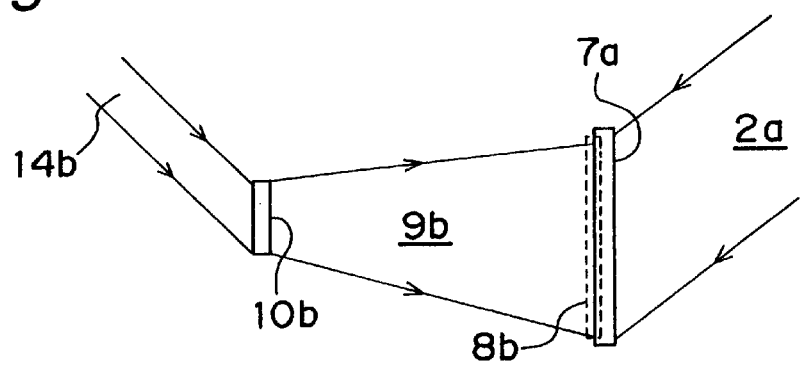
FIG. 7 is a diagram on photographing of a second step of a method of fabricating a hologram plate of reflection type in two-step photography.
Figure 8:
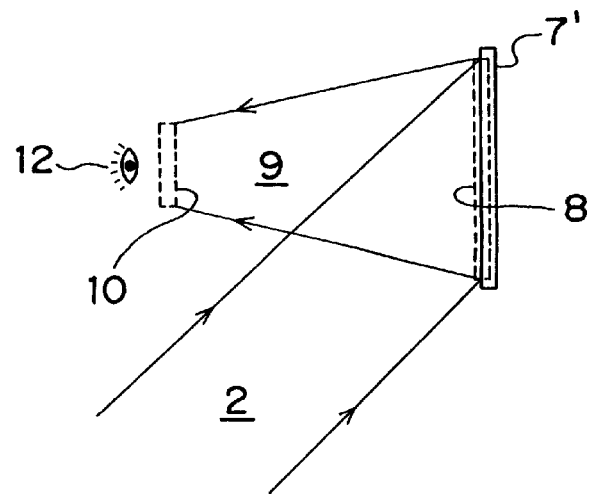
FIG. 8 is a diagram for illustrating observation of a screen hologram image with a hologram of reflection type.

FIGS. 6 to 8 show schematically a method for fabricating the hologram plate 7 of reflection type used in FIG. 5 with the two-step photography. At the first step in the two-step photography, as shown in FIG. 6, a white rectangular screen 8a is put in front of a film 10a for master hologram. Then, a coherent light beam from a light source such as a laser beam is halved by a half-mirror or the like. One of the light beams illuminates the screen 8a, and the light reflected thereby enters into the film 10a as object light 9a. The other thereof enters directly into the film 10a as reference light 14a. As a result, interference fringe of the object light 9a and the reference light 14a is recorded in the film 10a for master hologram.

In the second step in the two-step photography, as shown in FIG. 7, an illuminating light 14b having the same quality of coherency as the reference light 14a illuminates the master hologram plate 10b, in which the interference fringe formed on the film 10a is fixed at the first step, in a direction reverse to that of the reference light 14a. Then, a diffracted light beam 9b is generated to reproduce a screen hologram image 8b as the real image of the screen 8a. A film 7a for hologram of reflection type is put at the position of the screen hologram image 8b, and a reference light 2b separated from the same light source as the light beam 14b for illumination enters the film 7b at the same side as the diffracted light beam 9b. Thus, interference fringe of the diffracted light beam 9b with the reference light 2a is recorded in the film 7a for hologram of reflection type.

As shown in FIG. 8, the screen hologram image is viewed by using the hologram plate 7' of reflection type in which the interference fringe formed on the film 7a for the hologram of reflection type is fixed. An illuminating light 2 having the same quality of directivity as the reference light 2a illuminates the hologram plate 7' in a direction reverse to that of the reference light 2a. Then, a diffracted light beam 9 is generated to reproduce a screen hologram image 8 as the real image of the screen hologram image 8b and a master hologram image 10 as the real image of the master hologram image 10b. Thus, the screen hologram image 8 can be viewed clearly only when the eye 12 is put in the position of the planar master hologram plate image 10.

The one-visual-point image display apparatuses explained above have characteristics explained below. The diffracted light beam 9 outgoing from the hologram plate 7, 7' has a focal plane as the master hologram plate image 10, and the master hologram plate image 10 has a certain acceptable area in space, and the diffracted light beam is not condensed. Therefore, the diffracted light beam does not condense in a specified point, and it extends in a plane over an acceptable range in space. Then, it is possible for a viewer to move the eye 12 freely in the plane of the master hologram plate image 10. Thus, a viewer can see a dynamic image in an easy posture.

Further, because the diffracted beam extends in a plane over an acceptable range in space without condensed at a specified point, the unnecessary imaginary image of the master holograph plate image 10 is weakened to become invisible, or it is not adazzle. Because the screen hologram image 8 is reproduced on or near the plane of the hologram plate 7, the imaginary image of the screen hologram image 8 overlaps with the real image and becomes hard to be recognized. Because the entire screen is bright gently, a viewer can see the screen hologram image 8 affected by the mask image on or near the hologram plate, without dazzle light.

Figure 9:
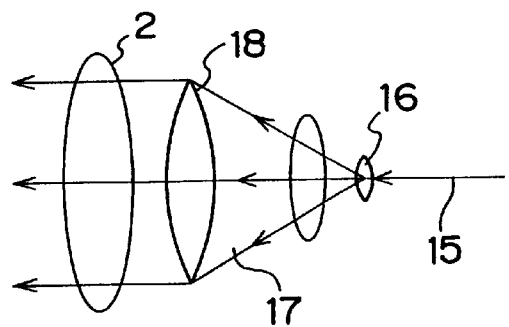
FIG. 9 is a diagram of a first example of a light beam generator.

FIGS. 9–13 show four examples of the light beam generator 11 for illumination used for the one-visual-point image display apparatuses shown in FIGS. 1 and 5. FIG. 9 shows a first example of a light beam generator. A point light source 15 illuminates a magnifying lens 16 at the center of a plane thereof along the central axis. The light outgoing from the other plane of the lens 16 is a diverging light beam 17. The diverging light beam 17 is incident on a plane of a convex lens 18. The central axis of the convex lens 18 is set to agree with that of the magnifying lens 16, and the center of the magnifying lens 16 is located at a focal point of the lens 18. Then, the light outgoing from the other plane of the convex lens 18 is a collimated light beam, and it propagates along a straight line connecting the central axes of the two lenses as the light beam 2 for illumination.

Figure 10:
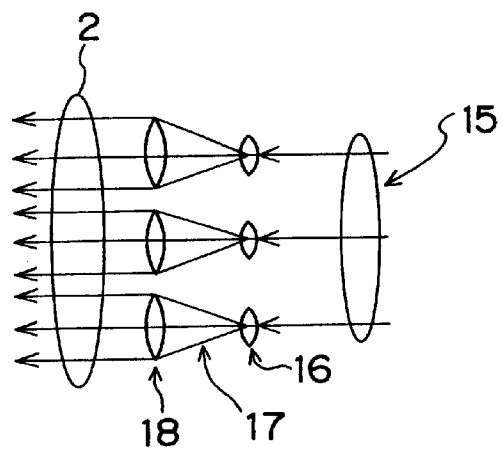
FIG. 10 is a diagram of a second example of the light beam generator.

FIG. 10 shows a second example of the light beam generator. In this example, a plurality of the sets shown in FIG. 9 of the point light source 2 and the two lenses 16 and 18 are arranged in parallel. The light beam 2 for illumination having a large cross section can be generated.

Figure 11:
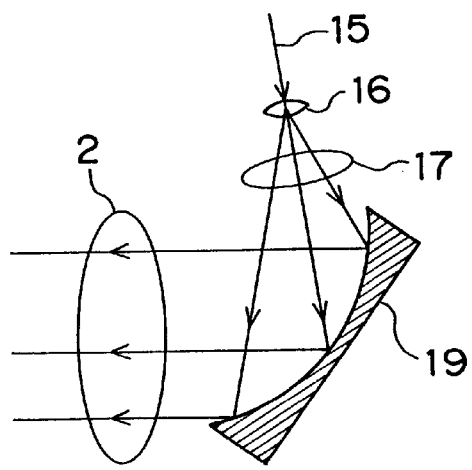
FIG. 11 is a diagram of a third example of the light beam generator.

FIG. 11 shows a third example of the light beam generator. A curved mirror 19 such as a concave mirror or a parabolic mirror is used instead of the convex lens 18 used in FIG. 9, and a magnifying lens 16 is put at the position of the focal point of the curved mirror 19. Then, the light outgoing from the curved mirror 19 is the light beam 2 for illumination.

Figure 12:
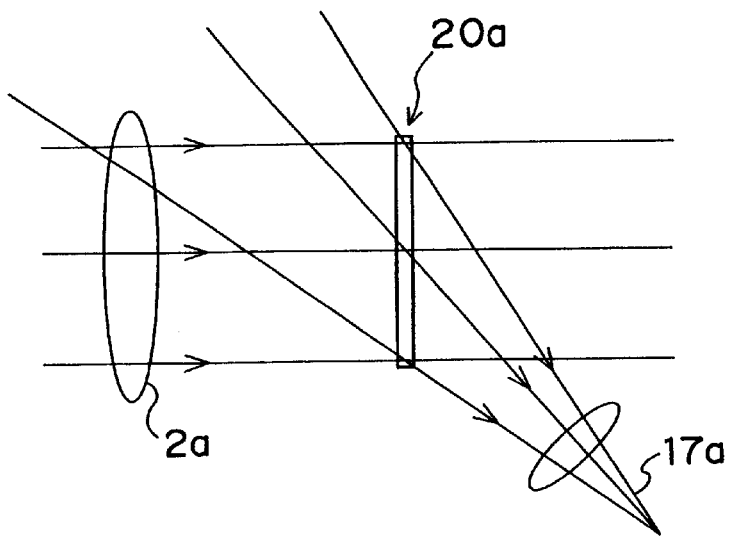
FIG. 12 is a diagram of fabrication of a grating hologram for a fourth example of the light beam generator.
Figure 13:
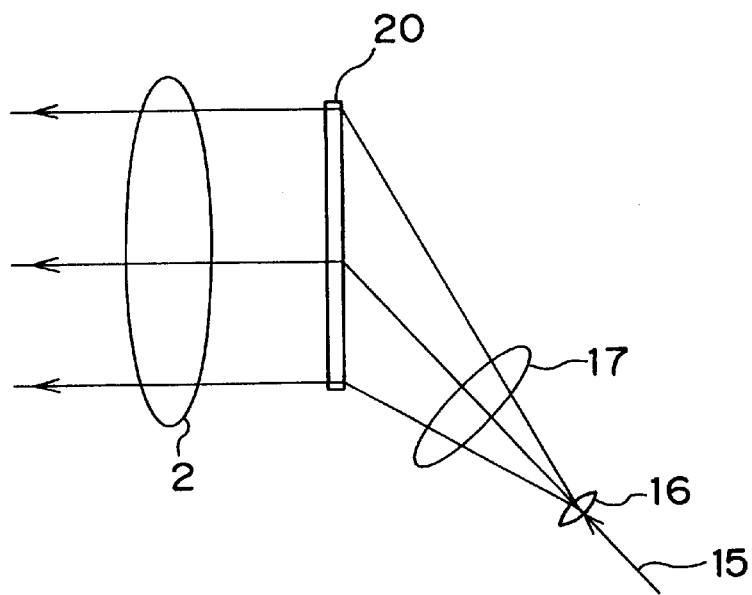
FIG. 13 is a diagram of use of the grating hologram for the fourth example of the light beam generator.

FIGS. 12 and 13 show a fourth example of the light beam generator, wherein as shown in FIG. 13, the light beam 2 for illumination is generated by using a grating hologram plate 20 instead of the convex lens used in FIG. 9. As shown in FIG. 12, a plane of a film 20a for a grating hologram plate is illuminated by a light beam 2a for illumination generated by one of the first to third examples or the like and by a converging light beam 17a separated from the same light source as the light beam 2a, and interference fringe of the two light beams is recorded in the film 20a. Thus, the grating hologram plate 20 is fabricated. In FIG. 13, a diverging light beam 17 having the coherency of the same quality as the converging light source 17a illuminates the grating hologram plate 20 on which the interference fringe formed on the film 20a is fixed, in a direction reverse to that of the converging light beam 17a. Thus, a diffracted light beam is generated as the light beam 2 for illumination.

Though a collimated light beam is used in the multi-visual-point image display devices according to embodiments of the invention, the light beam 2 for illumination generated by the light beam generator 11 is used as far as the light beam is directional, and it is not limited to a collimated light beam. A diverging light beam, or a light beam converging to a point may also be used. A diverging light beam or a converging one can be generated by the above-mentioned light beam generators by changing the position of the light source or the like.

Figure 14:
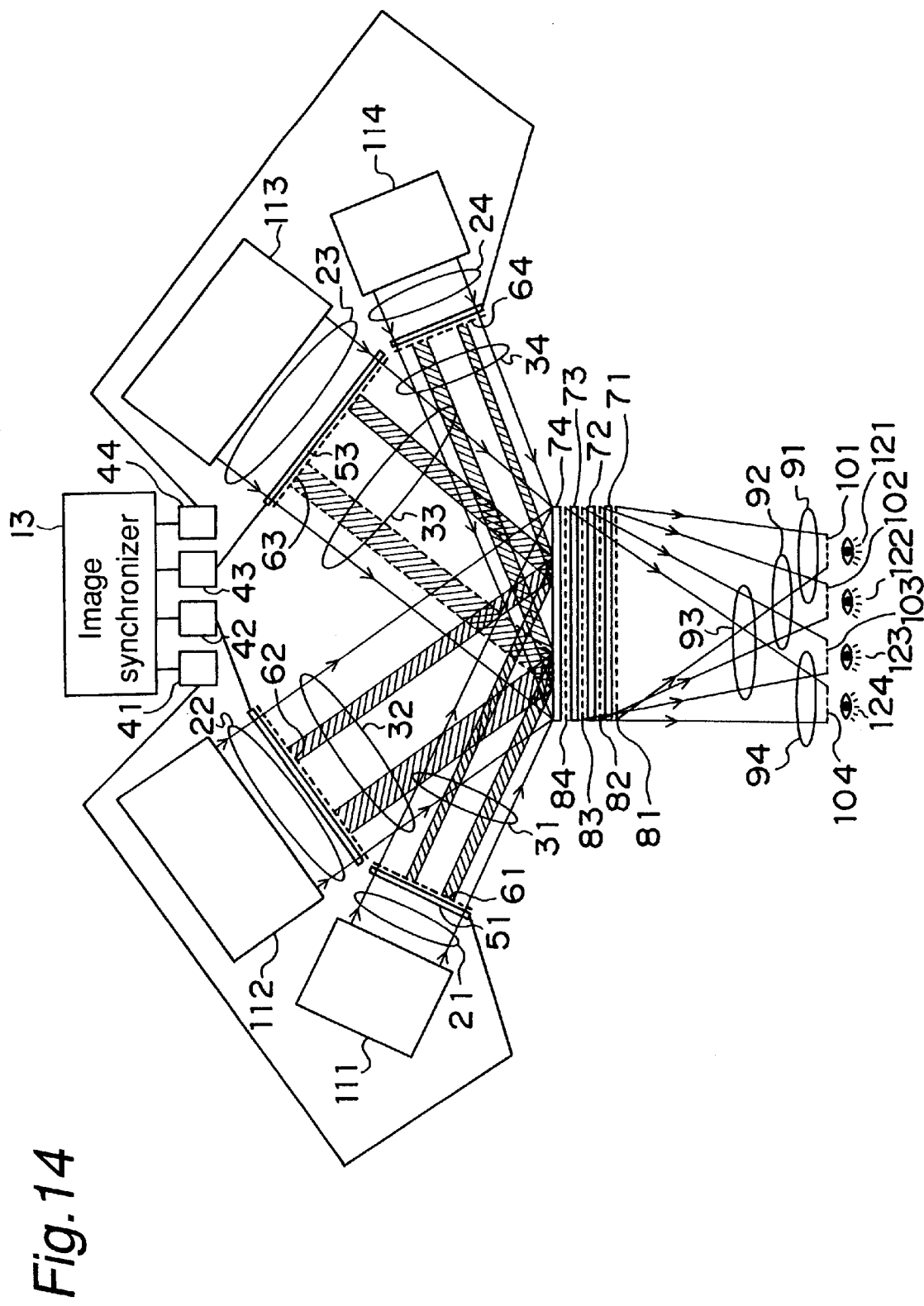
FIG. 14 is a diagram of a multi-visual-point image display apparatus according to a first embodiment of the invention using transmission type hologram images.

FIG. 14 shows an apparatus according to a first embodiment of the invention using four one-visual-point image display apparatuses shown in FIG. 1 which use transmission type holograms. Planes of hologram plates 71 74 of transmission type of the four one-visual-point image display apparatuses are overlapped partially or entirely, so that planes of master hologram plate images 101–104 are arranged at different positions in space. As shown in FIG. 14, the four master hologram plate images 101–104 are arranged a row from right to left. Mask image information generators 41–44 are connected to an image synchronizer 13 and generate monochromatic gradation mask image informations having different visual points at the same time continuously in correspondence to synchronization signals from the image synchronizer 13. The four one-visual-point image display apparatuses are arranged so that at least two master hologram plate images 102 and 103 in the four can be selected at the same time, wherein one eye 122 is put at least in the plane of a master hologram plate image 102 in the selected images while the other eye 123 is put at least in the plane of a further master hologram plate image 103 in the remaining images. Thus, the right and left eyes 122, 123 see respective screen hologram images 82 and 83 affected by different mask image patterns. When the mask image information generators 41–44 generate mask image informations in cooperation continuously, dynamic images with the mask image patterns changing in time emerge on the screen hologram images 81–84 of the one-visual-point image display apparatuses in correspondence to different visual points. Dynamic images at different visual points at the same time in correspondence to the right and left eyes 122, 123 can be provided for the right and left eyes 122, 123 separately. There are three combinations of the right and left eyes, that is, the right eye 121 and the left eye 122, the right eye 122 and the left eye 123, and the right eye 123 and the left eye 124.

Figure 15:
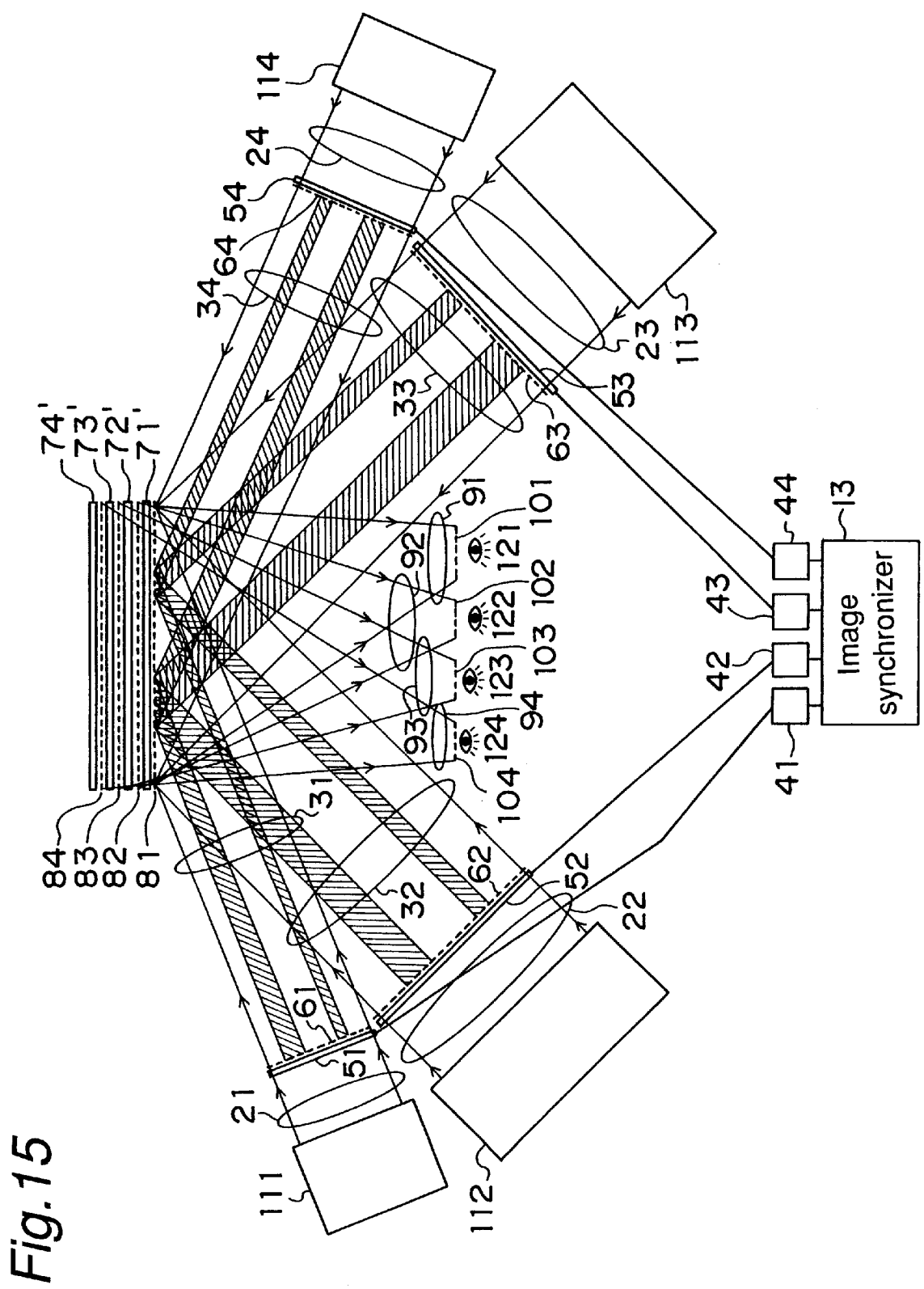
FIG. 15 is a diagram of a multi-visual-point image display apparatus according to a second embodiment of the invention using reflection type hologram images.

FIG. 15 shows a multi-visual-point image display apparatus according to a second embodiment of the invention. The apparatus uses four one-visual-point image display apparatuses shown in FIG. 5 which uses a reflection type hologram. The function of this multi-visual-point image display apparatus according to the second embodiment is similar that of the first embodiment except that the hologram plates 71'–74' of reflection type are used.

The planes of hologram plates 71'–74' of transmission type of the four one-visual-point image display apparatuses are overlapped partially or entirely, so that planes of master hologram plate images 101–104 are arranged at different positions in space. The four one-visual-point image display apparatuses are arranged so that at least two master hologram plate images 102 and 103 in the images can be selected at the same time, wherein one eye 121–124 is put at least in the plane of a master hologram plate image 101–104 in the selected images while the other eye 121–124 is put at least in the plane of a further master hologram plate image 101–104 in the remaining images. Thus, the right and left eyes 121–124 see respective screen hologram images 81–84 affected by different mask image patterns. Mask image information generators 41–44 of the four one-visual-point image display apparatuses are connected to an image synchronizer 13, and generate monochromatic gradation mask image informations having different visual points at the same time continuously in correspondence to synchronization signals of the image synchronizer 13. Dynamic images affected by the mask image patterns for different visual points changing in time emerge on the screen hologram images 81–84 of the four one-visual-point image display apparatuses, and different dynamic images having different visual points at the same time in correspondence to the positions of eyes 121–124 are provided for the right and left eyes 121–124 respectively.

In the multi-visual-point image display apparatus according to the first and second embodiments, the diffracted light beams 91–94 outgoing from the hologram plates 71–74, 71'–74' form focal planes as the master hologram plate images 101–104 in the plurality of one-visual-point image display apparatuses. Then, eyes 121–124 put on planes of the master hologram plate images 101–104 can be moved freely within the master hologram plate images 101–104. Therefore, even if the distances between left and right eyes are different among viewers, the difference in the distance can be fitted, and images from multi-visual-points can be viewed at easy pasture by putting left and right eyes 121–124 on the different planes of the master hologram plate images 101–104 in correspondence to right and left eyes.

Further, an observer sees the screen hologram images 81–84 affected by the mask image patterns on or near the hologram plates 71–74. Therefore, even if the positions of the two eyes of a viewer are distant from or near the hologram plates 71–74, the entire screen hologram images 81–84 are viewed from the right eye 121–123 and from the left eye 122–124. Images from multi-visual-points can be presented like natural stereovision in a wide field of view both for a large image display apparatus and for a small one.

Further, in a modified embodiment, the mask image information generators 41 and 43 provide screen hologram images 81 and 83 for right eye having the same visual point for eyes 121 and 123, while the mask image information generators 42 and 44 provide screen hologram images 82 and 84 for left eye having the same visual point for eyes 122 and 124. Then, dynamic images having the same visual points at the same time in correspondence to the positions of the left and right eyes are provided for the left eyes and for the right eyes respectively. Then, two or more people can see dynamic images of different visual points for left and right eyes similarly. For example, a first person sees an image with eyes 121 and 122, while a second person sees the image with eyes 123 and 124.

Figure 16:
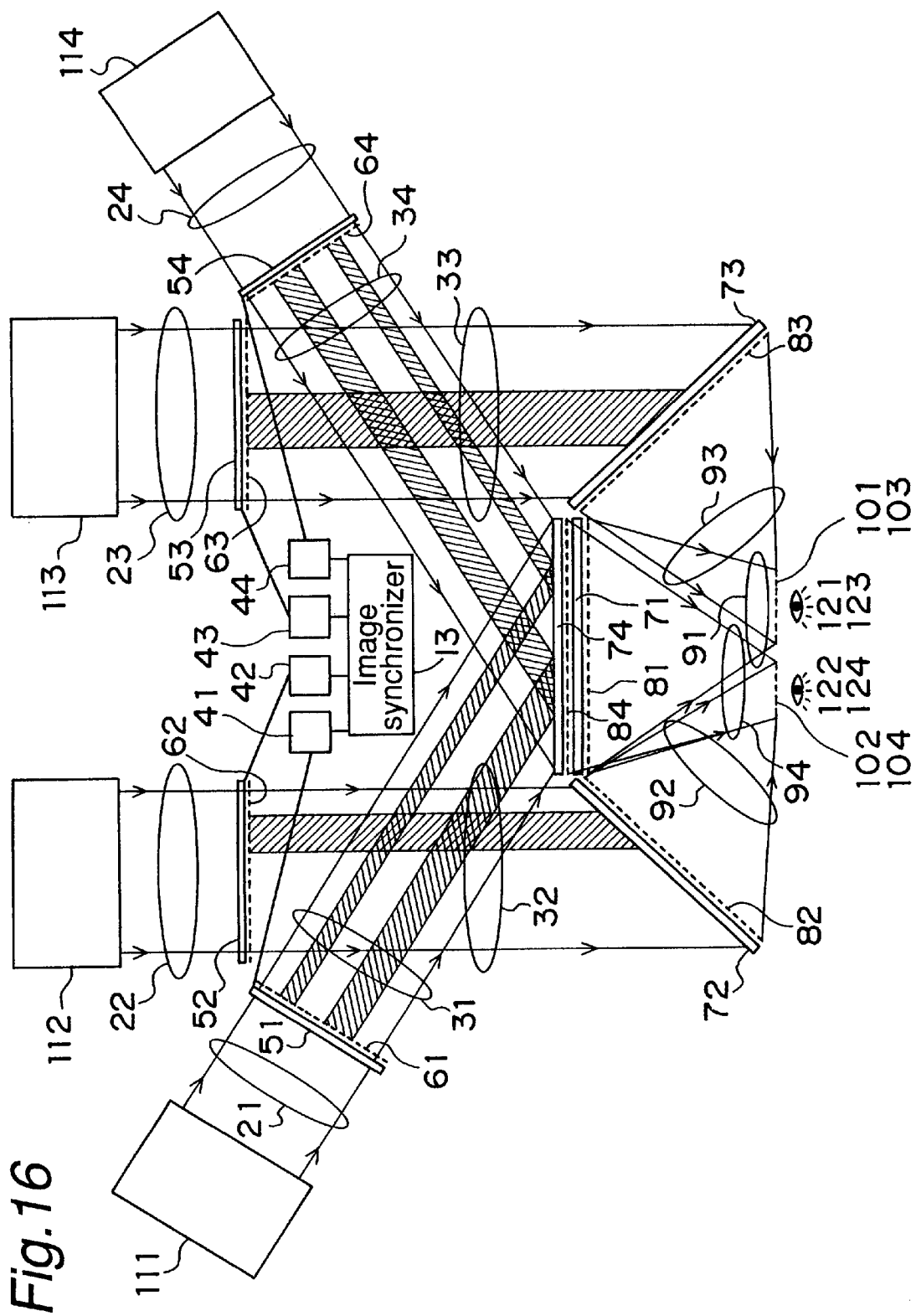
FIG. 16 is a diagram of a multi-visual-point image display apparatus according to a third embodiment of the invention using transmission type hologram images.

FIG. 16 shows a multi-visual-point image display apparatus according to a third embodiment of the invention. The apparatus uses four one-visual-point image display apparatuses shown in FIG. 1 with a transmission type hologram, for realizing a multi-visual-point image display apparatus for wide field of view. Only different points of the multi-visual-point image display apparatus of this embodiment from that of the first embodiment are explained here. Hologram plates 81 and 84 are arranged to overlap at the same positions, and hologram plates 82 and 83 are arranged at the two sides thereof. The four one-visual-point image display apparatuses are arranged so that master hologram images 101 and 103 generated by the two hologram plates 71 and 73 overlap each other at the same position, and master hologram images 102 and 104 generated by the two hologram plates 72 and 74 overlap each other similarly. In this arrangement, eyes 121 and 123 overlap at right eye, and eyes 122 and 124 overlap at left eye. Then, right eye can see continuous hologram images 81 and 83 at the right side, while left eye can see continuous hologram images 82 and 84 at the left side at the same time. As a result, because the diffracted light beams overlap around the center, a viewer can see dynamic images with different parallaxes in a wide field of view over a plurality of screen hologram images by right and left eyes respectively. Thus, a three-dimensional image can be viewed in a wide field of view of about 180 degree of entire visual angle.

Figure 17:
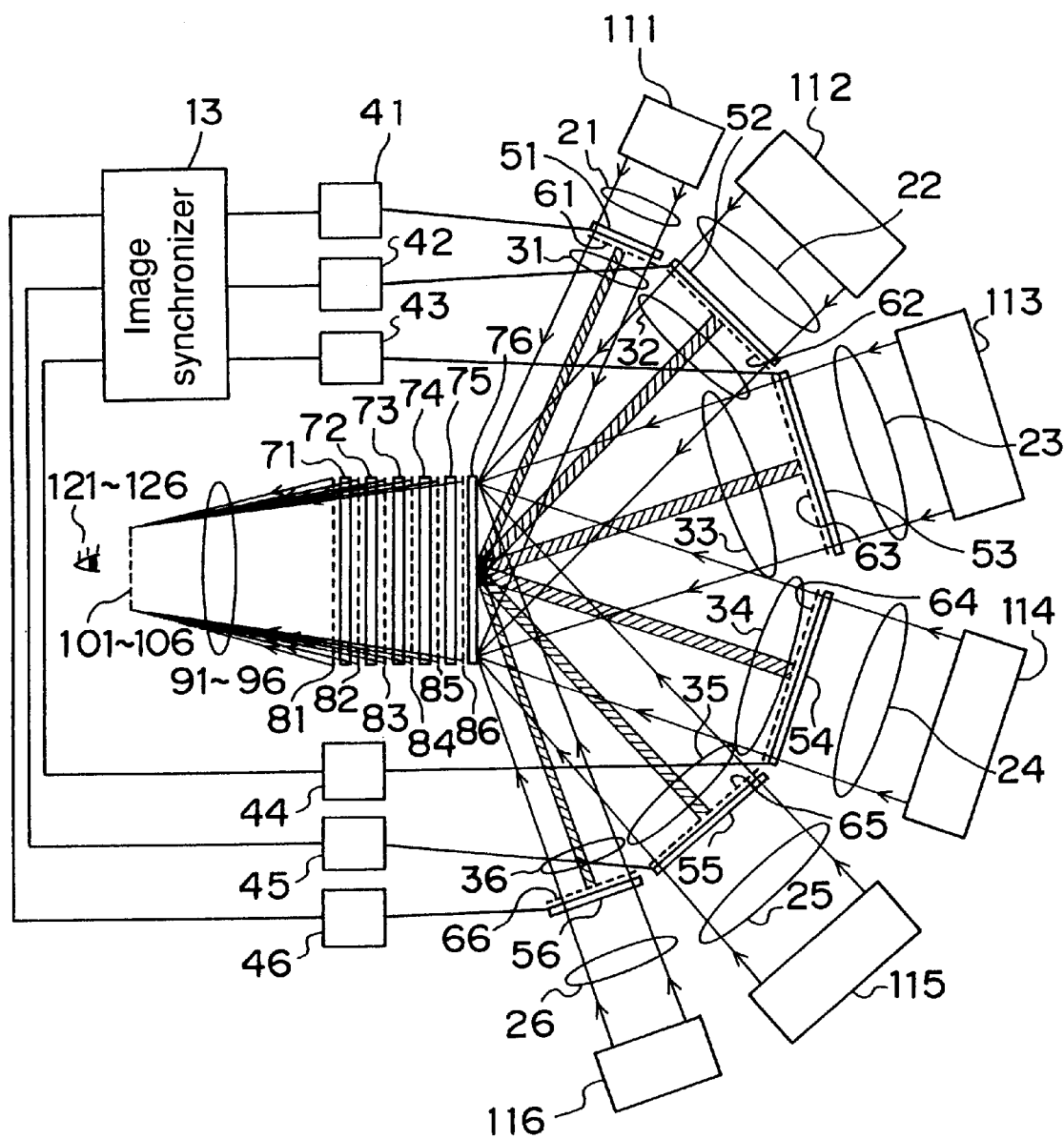
FIG. 17 is a diagram of a multi-visual-point image display apparatus according to a fourth embodiment of the invention using transmission type hologram images.
Figure 18:
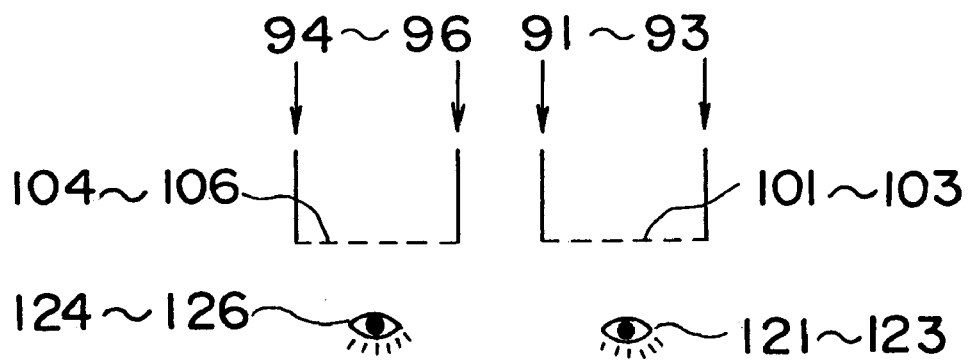
FIG. 18 is a diagram of positions of a master hologram image viewed along the right and left direction.

FIG. 17 shows a multi-visual-point image display apparatus according to a fourth embodiment of the invention. The apparatus uses six one-visual-point image display apparatuses shown in FIG. 1 with transmission type holograms, for realizing a multi-visual-points image display apparatus for color image. It is to be noted that FIG. 17 is a sectional view for illustrating arrangement in the vertical direction. This multi-visual-point image display apparatus is different from that of the first embodiment in following points beside the number of the one-visual-point image display apparatus. Incident directions to the hologram plates 71–76 of the post-mask light beams 31–36 are distributed in the vertical direction from top to bottom. Diffracted light beams 91–93 propagate to the master hologram plate images 101–103 overlapping at the same position, and right eye 121–123 sees screen hologram images 81–83 displaying an image for right eye. The colors of light beams 21–23 for illumination generated by light beam generators 111–113 are different as red, green and blue. The three colors of red, green and blue of the screen hologram images 81–83 are mixed, and right eye 121–123 sees a color image for right eye. This situation is similar for left eye. Diffracted light beams 94–96 propagate to the master hologram plate images 104–106 overlapping at the same position, and left eye 124–126 sees screen hologram images 84–86 displaying an image for left eye. The colors of light beams 24–26 for illumination generated by light beam generators 114–116 are different as red, green and blue. The three colors of red, green and blue of the screen hologram images 84–86 are mixed, and right eye 121–123 sees a color image for left eye. (Because FIG. 17 shows positions in the vertical direction, the master hologram plate images 101–106 and eyes 121–126 are illustrated to be overlapped. Actually, as shown in FIG. 18, the overlapping master hologram images 101–103 are adjacent to the other overlapping ones 104–106.) As a result, a viewer sees a three-dimensional color image with right and left eyes 121–123, 124–126 totally.

As explained above, in this embodiment, the colors of the light beams 21–26 for illumination generated by light beam generators 111–116 are different, and at least two master hologram plate images 101–103 and 104–106 are arranged at the same positions in space to overlap images of different colors. When eyes 121–123 and 124–126 are put at the planes of overlapping master hologram plate images, they see all the screen hologram images 81–83 and 84–86 in correspondence to the overlapping master hologram plate images at the same time. The hologram plates 71–73 and 74–76 in correspondence to the overlapping hologram plate images are arranged to be overlapped. Thus, color dynamic images from the same visual points are displayed on the overlapping screen hologram images 81–83 and 84–86 at the same time. By providing two or more sets having the above-mentioned structure, color dynamic images from different visual point are provided at the same time for right and left eyes respectively, and a viewer sees color dynamic images from different visual points with right and left eyes.

Next, a multi-visual-point image display apparatus according to a fifth embodiment of the invention is explained. Because the structure of the apparatus is similar to that shown in FIGS. 17 and 18, it is not shown for the brevity of explanation. The structure of the apparatus is different from that shown in FIGS. 17 and 18 in following points. Hologram plates 71–76 are rainbow holograms, and light beams 21–26 for illumination generated by light beam generators 111–116 are white light. Similarly to the apparatus of the third embodiment, at least two master hologram plate images 10 are arranged to be overlapped at the same positions in space, and when eyes 12 are put in the planes of the overlapping master hologram plate images 10, they see all the screen hologram images in correspondence to the overlapping master hologram plate images 10 at the same time. The hologram plates 7 in correspondence to the overlapping hologram plates 10 are also overlapped. Dynamic images from the same visual points are displayed at the same time on the overlapping screen hologram images.

In order to view a color three-dimensional image with right and left eyes, the diffracted light beams outgoing from the hologram plates 71–76 of rainbow hologram are dispersed as rainbow colors, so that the colors of the master hologram plate images 101–106 in the side of eyes 121–126 are set so that the image 101 is red, the image 102 is green, the image 103 is blue, the image 104 is blue, the image 105 is green and the image 106 is red. By the mask image information generators 41–46, dynamic images of the screen hologram images 81–83 and 84–86 of different colors are overlapped for right eye and for left eye, to provide a color image with different parallaxes totally for right eye and for left eye.

Next, a multi-visual-point image display apparatus according to a sixth embodiment of the invention is explained. Because the structure of the apparatus is similar to that shown in FIGS. 17 and 18, it is not shown for the brevity of explanation. The structure is different from that shown in FIGS. 17 and 18 in following points. Hologram plates 71–76 of the one-visual-point image display apparatuses are fabricated by using exposure with laser lights of three colors of red, green and blue in correspondence to the colors of the screen hologram images 81–86 in photographing. Further, the light beams 21–26 for illumination generated by the light beam generators 111–116 are polychromatic light or white light. Diffracted light beams 91–96 of colors in correspondence to respective recording colors of the hologram plates 71–76 are generated selectively, and the colors of the screen hologram images 81–86 are different. Then, dynamic images are displayed totally.

Figure 20:
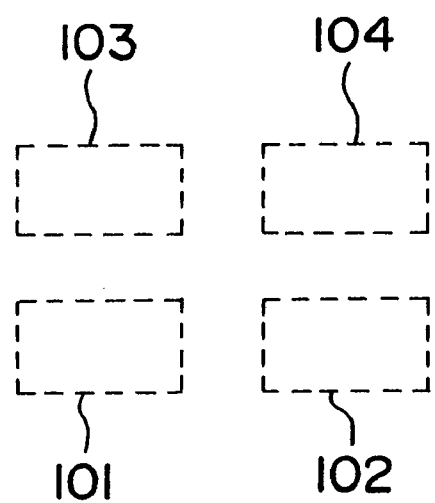
FIG. 20 is a diagram of positions of a master hologram image viewed at the front.
Figure 19:
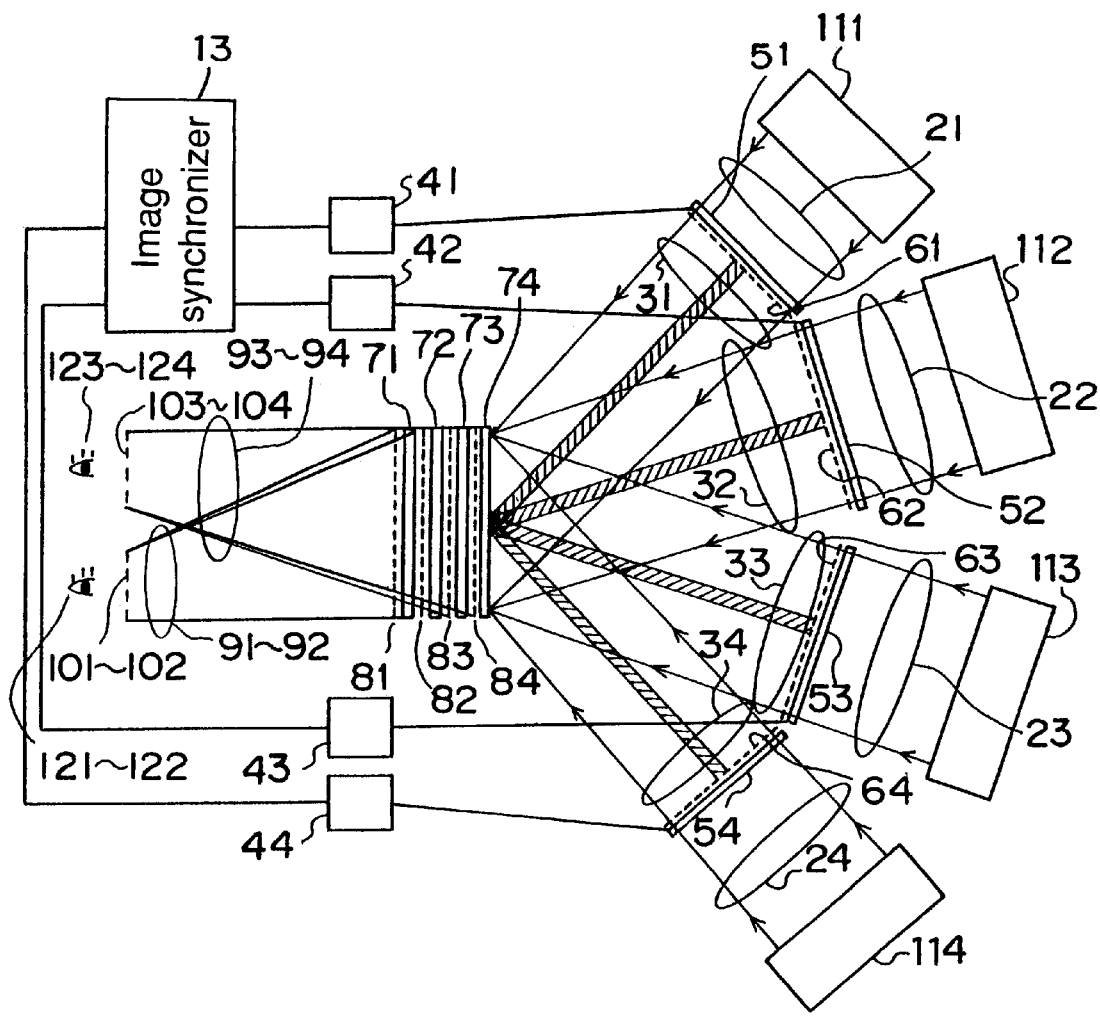
FIG. 19 is a diagram of a multi-visual-point image display apparatus according to a seventh embodiment of the invention using transmission type hologram images.

FIG. 19 shows a multi-visual-point image display apparatus according to a seventh embodiment of the invention. The apparatus uses four one-visual-point image display apparatuses shown in FIG. 1 with transmission type holograms, for realizing a multi-visual-point image display apparatus which accepts vertical movement of visual points. It is to be noted that FIG. 19 illustrates arrangement in the vertical direction. The multi-visual-point image display apparatus has at least two sets of the structure shown in FIG. 14. As shown in FIG. 20, right and left master hologram plate images 101–102 and 103–104 in each set are arranged vertically adjacent to each other. Mask images 61–64 generated by mask image information generators 41–44 in the one-visual-point image display apparatuses are displayed to change visual angle in correspondence to movement in the vertical direction. A viewer can select planes of at least two master hologram plate images 101–102 or 103–104 at the same time, wherein an eye 121, 123 is put at least in the plane of a master hologram plate image 101 or 103 in the selected images while the other eye 122, 124 is put at least in the plane of another master hologram plate image 102 or 104 in the remaining images. Thus, the right and left eyes 121–124 see respective screen hologram images 81–82 and 83–84 affected by different mask image patterns. Thus, dynamic images having different visual points in the vertical and horizontal directions are provided in correspondence to the viewer's movement of right and left eyes in the vertical direction.

In the multi-visual-point image display apparatus, by putting right eye 124 and left eye 123 above and by putting right eye 122 and left eye 121 below, the mask image information generators 41–44 display images of screen hologram images 81–84 in correspondence to visual angles at the hologram plates 71–74. Then, by agreeing with visual angles of the viewer's right and left eyes to the hologram plates 71–74, dynamic images with different visual points in the horizontal direction are shown above for right and left eyes 124 and 123, and dynamic images with different visual points in the horizontal direction are shown below for right and left eyes 122 and 121.

FIG. 21 is a diagram of a multi-visual-point image display apparatus according to an eighth embodiment of the invention. The apparatus uses four one-visual-point image display apparatuses shown in FIG. 1 with transmission type holograms, for realizing a multi-visual-point image display apparatus which accepts movement of visual points in the depth direction. The multi-visual-point image display apparatus has at least two sets of the structure shown in FIG. 14. In the multi-visual-point image display apparatus in each set, planes of at least two master hologram plate images 10 can be selected at the same time, wherein an eye 12 is put at least in the plane of a master hologram plate image 10 in the selected images while the other eye 12 is put at least in the plane of another master hologram plate image 10 in the remaining images. The right and left master hologram plate images 10 in each set are arranged at different distances from the hologram plates 7 in the depth direction. Mask images generated by the mask image information generators 4 in the one-visual-point image display apparatus are displayed by changing the visual angle and an expansion or reduction ratio in correspondence to the depth. Thus, right and left dynamic images having different visual points are provided in correspondence to the distance of the viewer's eyes from the hologram plates 7 in the depth direction.

In the multi-visual-point image display apparatus, by putting right eye 124 and left eye 123 at the front side and by putting right eye 122 and left eye 121 at the back side, images are displayed by changing the visual angle and the expansion or reduction ratio of the screen hologram images 81–84 in correspondence to the distance from the hologram plates 71–74. Then, in correspondence to the distance in the depth direction of the viewer's right and left eyes to the hologram plates 71–74, right and left dynamic images with different visual points in the depth direction are provided in the front position for right and left eyes 124 and 123, and dynamic images with different visual points are provided in the back position for right and left eyes 122 and 121.

The above-mentioned embodiments have following advantages.

In the one-visual-point image display apparatus and the multi-visual-point image display apparatus according to the invention, diffracted light beams outgoing from the hologram plates have focal planes as master hologram plate images. Therefore, the diffracted light beams are not condensed at particular points, and they extend in a plane over an acceptable range. Then, eyes put on the plane of the master hologram plate images can be moved in the planes of the master hologram plate images.

Further, in the one-visual-point image display apparatus and the multi-visual-point image display apparatus according to the invention, because diffracted light beams outgoing from the hologram plates have focal planes, the diffracted light beams are not condensed at particular points, and they extend in a plane over an acceptable range. Then, unnecessary imaginary images is weakened and becomes invisible.

Further, in the one-visual-point image display apparatus and the multi-visual-point image display apparatus according to the invention, the screen hologram images are reproduced on or near the planes of the hologram plates. Then, the imaginary image of the screen hologram image overlaps with the real image thereof and becomes hard to be recognized. Thus, images from different visual points are displayed with uniform brightness over the entire screen.

Further, in the one-visual-point image display apparatus and the multi-visual-point image display apparatus according to the invention, distortion correction becomes easy in the vertical and horizontal directions of the mask image patterns generated by the mask image information generators, and correct images without distortion are projected over the entire screen hologram images in a wide range including the perimeter thereof.

Further, according to the invention, dynamic images at different visual points in correspondence to the positions of right and left eyes are provided on the screens at the same time for right and left eyes.

Further, according to the invention, even if the distance between left and right eyes is different among viewers, the difference in the distance can be fitted, and images from multi-visual-points can be viewed at easy posture by putting left and right eyes on different planes of the master hologram plate images in correspondence to right and left eyes.

Further, according to the invention, even if the positions of the two eyes are near to or far from the hologram plates, by viewing the entire screen hologram images from right and left eyes, a multi-visual-points image can be displayed similarly to natural stereovision in a wide field of view, both for a compact image display apparatus and for a large one.

Further, according to the invention, at least two sets are provided of the structures for viewing respective screen hologram images affected by different mask image patterns for right and left eyes. By providing respective dynamic images from the same visual points for right eyes and for left eyes, two or more persons can view dynamic images having different visual points for right and left eyes in a similar way.

Further, according to the invention, by overlapping at least two master hologram plate images at the same positions in space and putting eyes at the overlapped master hologram plate images, all the screen hologram images in correspondence to the overlapped hologram plate images can be viewed at the same time. Therefore, not all the planes of the screen hologram images in correspondence to the overlapped hologram plate images are overlapped but extend over a wide field of view. Then, dynamic images from different visual points in a wide field of view can be provides at the same time for right and left eyes respectively.

Further, according to the invention, dynamic color images of overlapping screen hologram images are displayed by using different colors of the light beams for illumination, and right and left dynamic color images are provided for right and left eyes at the same time respectively.

Further, according to the invention, an entire color image is displayed by dispersing the diffracted light beams outgoing from the hologram plates of rainbow holograms into rainbow colors and overlapping dynamic color images of the screen hologram images of different colors. Then, right and left dynamic color images from different visual points are provided for right and left eyes at the same time respectively.

Further, according to the invention, lasers of at least three colors of red, green and blue are used for exposure in correspondence to colors of the screen hologram images for photographing the hologram plates, and light beams for exposure are polychromatic light or white light. Thus, dynamic images of the screen hologram images can be displayed as color images.

Further, according to the invention, right and left master hologram plate images in each set are arranged adjacent to each other in the vertical direction, and the mask images generated by the mask image information generators are displayed by changing visual angle according to the movement in the vertical direction. Then, dynamic images from different visual points in the vertical and horizontal directions are provided in correspondence to the movement of the viewer's right and left eyes in the vertical direction.

Further, according to the invention, right and left master hologram plate images in each set are arranged at different distances from the hologram plates in the depth direction, and the mask images generated by the mask image information generators are displayed by changing visual angle and an expansion or reduction ratio according to the depth. Then, dynamic images from different visual points in horizontal direction are provided in correspondence to the distance of the viewer's right and left eyes in the depth direction.

A hologram plate used in the above-mentioned one-visual-point image display apparatuses and the abovementioned multi-visual-points image display apparatuses can be fabricated to generate a plurality of focal planes at different positions. Then, the structure of the apparatus can be simplified, and the number of the hologram plates can be decreased.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A one-visual-point image display apparatus comprising:
    a light beam generator for illumination which generates a directional light beam;
    a master hologram plate of transmission type or reflection type which diffracts the light beam to generate a directional diffracted light beam, said hologram plate reproducing a screen as a hologram image on or near a plane of said hologram plate; said diffracted light beam forming a focal plane; said master hologram plate being formed by the steps of:
    placing the hologram plate at the focal plane and
    recording an image on said plate using two-step holography;
    a mask image display device is set at a position crossing an optical path of the light beam generated by said light beam generator and displays a two-dimensional mask image pattern which masks the light beam transmitting a post-mask light beam and projecting the mask image pattern onto said hologram plate so as to project the mask image pattern on the reproduced hologram image; and
    a mask image information generator which transmits mask image information to said mask image display device and makes said mask image display device display the mask image pattern.

2. The one-visual-point image display apparatus according to claim 1, wherein said mask image display device has at least one length of a side of the mask image pattern displayed by said mask image display device to coincide with a length of a counterpart side of said hologram plate and lengths of the other sides thereof enlarged or reduced with a ratio of lengths of counterpart sides of said mask image display device and said hologram plate.

3. The one-visual-point image display apparatus according to claim 1, wherein the light beam for illumination generated by said light beam generator is a collimated beam.

4. The one-visual-point image display apparatus according to claim 1, wherein the light beam for illumination generated by said light beam generator is a diverging beam.

5. The one-visual-point image display apparatus according to claim 1, wherein the light beam for illumination generated by said light beam generator is a converging beam.

6. The one-visual-point image display apparatus according to claim 1, wherein said hologram plate transmits light in an external field of view in front of said hologram plate.

7. The one-visual-point image display apparatus according to claim 1, wherein said hologram plate is of reflection type and a light-shielding plate is provided between said hologram plate and the external field of view in front of said hologram plate.

8. The one-visual-point image display apparatus according to claim 1, wherein the mask image information transmitted by said mask image information generator is information on monochromatic gradation mask image pattern.

9. The one-visual-point image display apparatus according to claim 1, wherein said hologram plate generates a plurality of focal planes at different positions.

10. A multi-visual-points image display apparatus comprising a plurality of one-visual-point image display apparatuses, each of said plurality of one of one-visual-point image display apparatuses comprising:
    a light beam generator for illumination which generates a directional light beam;
    a master hologram plate of transmission type or reflection type which diffracts the light beam to generate a directional diffracted light beam, said hologram plate reproducing a screen as a hologram image on or near a plane of said hologram plate; said diffracted light beam forming a focal plane; said master hologram plate being formed by the steps of:
    placing the hologram plate at the focal plane and
    recording an image on said plate using two-step holography;
    a mask image display device is set at a position crossing an optical path of the light beam generated by said light beam generator and displays a two-dimensional mask image pattern which masks the light beam transmitting a post-mask light beam and projecting the mask image pattern onto said hologram plate so as to project the mask image pattern on the reproduced hologram image; and
    a mask image information generator which transmits mask image information to said mask image display device and makes said mask image display device display the mask image pattern;
    wherein said plurality of one-visual-point image display apparatuses are arranged such that each of said focal planes of said plurality of one-visual-point image display apparatuses exist at at least two different positions in space, wherein right and left eyes of a viewer are located at the same time within the focal planes at the different positions.

11. The multi-visual-points image display apparatus according to claim 10, comprising at least two sets of said plurality of one-visual-point image display apparatuses; wherein
the focal planes of one of a first of said sets overlaps with the focal planes of a second of the first set;
the focal planes of one of a second of said sets overlaps with the focal planes of a second of the second said sets;
the overlapped focal planes each forming a focal plane group; the focal plane group overlapping.

12. The multi-visual-points image display apparatus according to claim 10, wherein all or a part of hologram images of each said screen of said plurality of one-visual-point image display apparatuses are overlapped at the same position in space, and all the focal planes in correspondence to the overlapped hologram images of said screens are arranged at different positions in space such that right and left eyes of a viewer are put within the focal planes at the different positions at the same time, whereby the hologram images of the screens are viewed independently of each other.

13. The multi-visual-points image display apparatus according to claim 11, wherein all or a part of the hologram images of each screen in each of at least two sets of said plurality of one-visual-point image display apparatuses are overlapped at the same position in space, and all the focal planes in correspondence to the overlapped hologram images of screens in all the sets are arranged at different positions in space such that right and left eyes of a viewer are put within the focal planes at the different positions at the same time, whereby the hologram images of the screens are viewed independently of each other.

14. The multi-visual-points image display apparatus according to claim 11, wherein said plurality of one-visual point image display apparatuses are combined in said at least two sets; wherein in each set, at least two of said screen hologram images and at least two of said focal planes are overlapped at the same positions in space, respectively, colors of the light beams for illumination generated by said light beam generators are different, each of said hologram plates have been fabricated in two-step holography by using corresponding different colors, each of said mask image information generators transmits information on mask image pattern corresponding to a color, said plurality of one-visual-point image display apparatuses are arranged such that when eyes of a viewer are put in a range of the focal plane group, the colors are mixed to form one color screen hologram image;
wherein the focal plane groups in each of said at least two sets are arranged at at least two different positions in space such that right and left eyes of a viewer are put within the focal plane groups at different positions at the same time.

15. The multi-visual-points image display apparatus according to claim 14, wherein all or a part of the screen hologram images viewed as one image in each set of said at least two sets of said one-visual-points image display apparatuses are overlapped at the same position in space, and the focal plane groups of all the sets in correspondence to the overlapped screen hologram images are arranged at different positions in space;
wherein right and left eyes of a viewer can be put within the focal plane groups at the different positions.

16. The multi-visual-points image display apparatus according to claim 14, wherein the different colors are red, green and blue.

17. The multi-visual-points image display apparatus according to claim 14, wherein said light generator in said one-visual-point image display apparatus generates a light beam for illumination of polychromatic light or white light, each of said hologram plates having been fabricated two-step holography in with different colors, each of said hologram plates generating the diffracted light beam of a corresponding color, whereby the overlapped color screen hologram images can be viewed.

18. The multi-visual-points image display apparatus according to claim 14, wherein said light generator in said one-visual-point image display apparatus generates a light beam for illumination of polychromatic light or white light, each of said hologram plates have been fabricated as a rainbow hologram plate, and each of said hologram plates is reproduced to form the focal planes of rainbow colors by diffracted light beams and dispersed into rainbow colors, the focal planes being arranged to be displaced each other in parallel to overlap portions of different colors at the same position in space.

19. The multi-visual-points image display apparatus according to claim 10, wherein at least two sets are provided, each set comprising said multi-visual-points image display apparatus having at least two visual points, the focal planes of said one-visual-points image display apparatuses in each set being arranged at adjacent positions to each other; and said mask image information generators generate mask image patterns in correspondence to the position of the focal planes from right side to left side in each set.

20. The multi-visual-points image display apparatus according to claim 19, wherein a focal plane at the leftmost end of said one-visual-point image display apparatus in one of the sets is arranged near a focal plane at the rightmost end of said one-visual-point image display apparatus in another of the sets.

21. The multi-visual-points image display apparatus according to claim 10, wherein at least two sets are provided wherein one-visual-points image display apparatuses having at least two visual points are combined as a set, the focal planes of said one-visual-points image display apparatuses in each set are arranged at adjacent positions to each other;
a row of the focal planes in each set are arranged at different positions adjacent in depth direction back and forth; and
said mask image information generators generate mask image informations by changing visual angle and an expansion or reduction ratio on the mask image pattern of the mask image information to be generated according to distance in depth direction.

22. The multi-visual-points image display apparatus according to claim 10, wherein at least two sets are provided wherein one-visual-points image display apparatuses with at least two visual points are combined as a set, the focal planes of said one-visual-points image display apparatuses in each set are arranged at adjacent positions to each other;
a row of the focal planes in each set are arranged at different positions adjacent in the vertical direction; and
said mask image information generators generate mask image informations by changing difference in visual angle on the mask image pattern of the mask image information to be generated according to difference in visual angle in the vertical direction.

23. The multi-visual-points image display apparatus according to claim 10, wherein the mask image information transmitted by said mask image information generators in said one-visual-points image display apparatuses is information on monochromatic gradation mask image pattern.

24. The multi-visual-points image display apparatus according to claim 10, further comprising an image synchronizer connected to said mask image information generators and supplying synchronization signals to generate mask image patterns, wherein the mask image patterns at different visual directions at the same time are displayed by agreeing timings with each other automatically.

25. The multi-visual-points image display apparatus according to claim 10, wherein at least two in said one-visual-point image display apparatuses have a common hologram plate as said hologram plates, and said common hologram plate records screen hologram images overlapped with each other of said at least two one-visual-point image display apparatuses on or near said hologram plate.

26. The multi-visual-points image display apparatus according to claim 10, wherein at least one hologram plate in said one-visual-point image display apparatus has a plurality of focal planes at different positions in space.

* * * * *